(12) United States Patent
Deguchi et al.

(10) Patent No.: US 7,427,748 B2
(45) Date of Patent: Sep. 23, 2008

(54) REFLECTION TYPE PHOTOELECTRIC SWITCH

(75) Inventors: Tomoki Deguchi, Osaka (JP); Katsunari Koyama, Osaka (JP)

(73) Assignee: Keyence Corporation, Osaka (JP)

( * ) Notice: Subject to any disclaimer, the term of this patent is extended or adjusted under 35 U.S.C. 154(b) by 161 days.

(21) Appl. No.: 11/452,847

(22) Filed: Jun. 14, 2006

(65) Prior Publication Data
US 2006/0279867 A1    Dec. 14, 2006

(30) Foreign Application Priority Data
Jun. 14, 2005    (JP)    ............ P 2005-173589

(51) Int. Cl.
*H01J 5/16* (2006.01)
(52) U.S. Cl. ............ 250/239; 250/221; 250/216
(58) Field of Classification Search ............ 250/221, 250/239
See application file for complete search history.

(56) References Cited
U.S. PATENT DOCUMENTS
4,217,492 A * 8/1980 Fayfield ............ 250/239

2006/0278815 A1    12/2006    Daguchi et al.

FOREIGN PATENT DOCUMENTS
JP    A-10-255611    9/1998
JP    A-2002-246636    8/2002

* cited by examiner

*Primary Examiner*—Georgia Y. Epps
*Assistant Examiner*—Tony Ko
(74) *Attorney, Agent, or Firm*—Kilyk & Bowersox, P.L.L.C.

(57) ABSTRACT

A circuit substrate is divided into a light emitting circuit substrate 60 and a light receiving circuit substrate 70, and they are disposed in a first casing 21 in a two-tier fashion, and the light emitting circuit substrate 60, which is disposed on an upper side, is overlapped with at least a part of an optical system 40. By this means, it is possible to obtain a wider range mounting surface in a small space, and therefore, it is possible to miniaturize a switch main body. In addition, it is possible to miniaturize the switch main body without miniaturizing the optical system 40 more than necessity, simply by changing a disposal configuration of components other than components of the optical system 40 in the switch main body, and therefore, it is possible to prevent lowering of detection accuracy which goes with miniaturization of the optical system 40, and it is possible to detect an object with high accuracy.

16 Claims, 14 Drawing Sheets

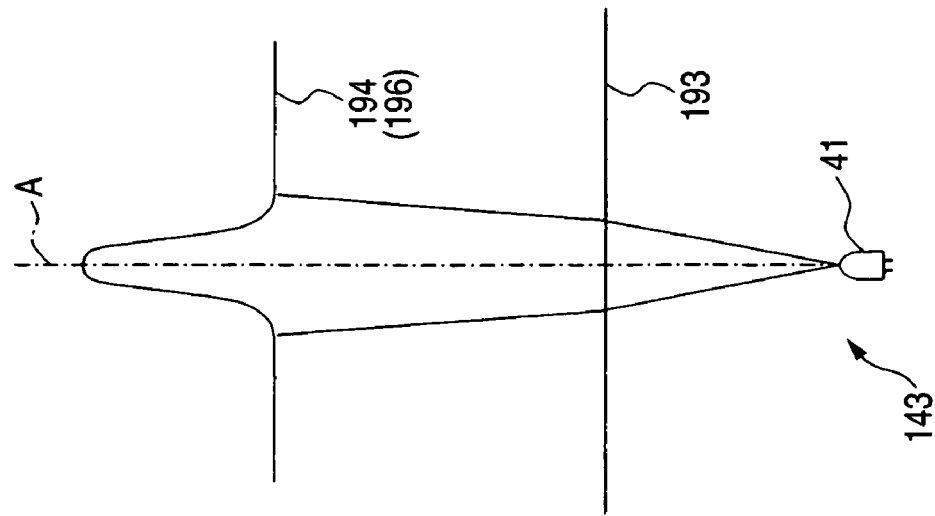
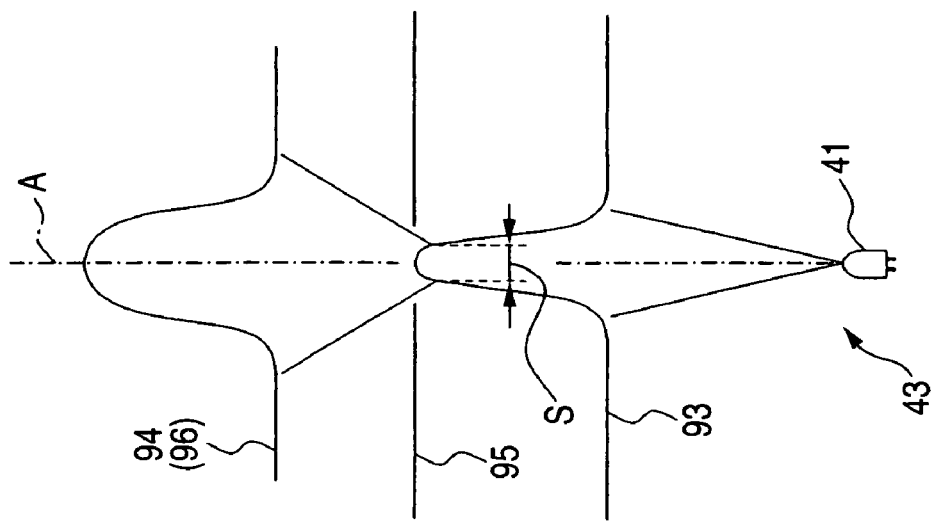

REFLECTION TYPE PHOTOELECTRIC SWITCH

TECHNICAL FIELD

The present disclosure relates to a reflection type photoelectric switch. More particularly, the present disclosure relates to improvement of a disposal configuration of components which are disposed in a reflection type photoelectric switch.

RELATED ART

A regressive reflection type photoelectric switch has been known as a reflection type photoelectric switch which receives reflected light of light irradiated from a light emitting element, by a light receiving element, and detects an object on the basis of its amount of light received (e.g., Japanese Patent Unexamined Publication No. 2002-246636 which is referred as Patent Document 1, and Japanese-Patent Unexamined Publication No. 10-255611 which is referred as Patent Document 2). In the regressive reflection type photoelectric switch, laser right is irradiated toward a regressive reflection plate on which a three-dimensional reflection surface was formed by such a matter that a lot of protruding portions of a three-dimensional shape such as a polyangular cone shape and a spherical shape are disposed, and reflected light from the regressive reflection plate is received by a light receiving element.

Miniaturization of a reflection type photoelectric switch including a regressive reflection type photoelectric switch has been desired. In Patent Document 2, miniaturization of a switchmen body is realized by miniaturizing an optical system including a light emitting element and a light receiving element, in a regressive reflection type photoelectric switch.

In a reflection type photoelectric switch, the more an amount of light emitted from a light emitting element and a received light amount of reflected light in a light receiving element are, the larger a difference of a received light amount depending on presence and absence of an object becomes, and therefore, an error on the occasion of comparing a received light amount with a threshold value is few, and it is possible to detect an object with higher accuracy. Therefore, in order to detect an object with high accuracy, there is such necessity that an optical system has a certain level of size, and miniaturization of the above-mentioned optical system has limitations. In addition, even if it is tried to miniaturize an optical system by a method other than the above-mentioned one, miniaturization in an entire photoelectric switch is not realized, unless other members become reduced in size.

Then, it is conceivable to miniaturize a switch main body by changing a configuration of components other than components of an optical system in a switch main body. For example, it is conceivable to miniaturize a switch main body by adopting a flexible substrate having flexibility, in lieu of a hard substrate such as a glass epoxy substrate, as a circuit substrate for mounting a control circuit of a light emitting element and a light receiving element, and disposing it in such a situation that the flexible substrate is bowed down in an open space. However, the flexible substrate is expensive as compared with the hard substrate, and therefore, when the flexible substrate is adopted, there is such a problem that it is not possible to configure a switch main body inexpensively.

SUMMARY

Embodiments of the present invention provide a small size reflection type photoelectric switch which can detect an object with high accuracy.

In addition, embodiments of the present invention provide a small size inexpensive reflection type photoelectric switch.

According to an aspect of one or more embodiments of the invention, a reflection type photoelectric switch which receives reflected light of light irradiated from a light emitting element, by a light receiving element, and detects an object on the basis of its amount of light received, equipped with a first casing which has a mounting surface internally, and in which an opening portion is formed so as to face to the mounting surface, a second casing which covers the opening portion, an optical system including the light emitting element and the light receiving element, which is disposed in a predetermined area on the mounting surface in the first casing, a light emitting circuit substrate which is disposed in the first casing, and in which a control circuit of the light emitting element is mounted, and a light receiving circuit substrate which is disposed in the first casing, and in which a control circuit of the light receiving element is mounted, and, configured in such a manner that one of the light emitting circuit substrate and the light receiving circuit substrate is disposed in an area other than an area on the mounting surface in the first casing in which the optical system is disposed, and the other is disposed so as to be overlapped with at least a part of the optical system, on the opening portion side in the first casing.

According to the such like configuration, a circuit substrate is divided into the light emitting circuit substrate and the light receiving circuit substrate, and they are disposed in the first casing in a two-tier fashion, and one of them is overlapped with at least a part of the optical system, and thereby, it is possible to obtain a wider range mounting surface in a small space, and therefore, it is possible to miniaturize a switch main body. There is not such necessity that a control circuit of a light emitting element and a control circuit of a light receiving element are electrically connected each other in a switch main body, and therefore, even in such a configuration that these things are mounted on different circuit substrates and respective circuit substrates are disposed in two-tier fashion, there is not such a case that workability at the time of fabrication comes down.

In addition, it is possible to miniaturize a switch main body without miniaturizing an optical system more than necessity, simply by changing a disposal configuration of components other than components of the optical system in a switch main body, and therefore, it is possible to prevent lowering of detection accuracy which goes with miniaturization of the optical system, and it is possible to detect an object with high accuracy.

In the reflection type photoelectric switch according to the present disclosure, the light receiving circuit substrate is disposed in an area other than an area on the mounting surface in the first casing in which the optical system is disposed. Further, the light emitting circuit substrate is disposed on the opening portion side in the first casing so as to be overlapped with at least a part of the optical system when they are viewed from the opening portion.

According to the such like configuration, it is possible to insert the light receiving circuit substrate in the first casing from the opening portion, and dispose it in an area other than an area on a mounting surface in which the optical system is disposed, and thereafter, insert the light emitting circuit substrate in the first casing from the opening portion, and disposed it so as to be overlapped with at least a part of the optical system on the opening portion side to the light receiving circuit substrate.

A control circuit, which is mounted on the light emitting circuit substrate, is normally equipped with a variable resistor for adjusting an amount of light irradiated of a light emitting element. Adjustment of a irradiated light amount of a light emitting element is carried out after the light receiving circuit substrate and the light emitting circuit substrate are incorporated in the first casing, but at this time, if the light receiving circuit substrate is disposed on the opening portion side rather than the light emitting circuit substrate, it is not possible to operate the variable resistor. If it is configured in such a manner that the light emitting circuit substrate is disposed on the opening portion side rather than the light receiving circuit substrate, like the present invention, even after the light receiving circuit substrate and the light emitting circuit substrate are incorporated into the first casing, it is possible to carry out adjustment of an irradiated light amount of a light emitting element by operating the variable resistor from the opening portion side.

In the reflection type photoelectric switch according to the present disclosure, on the light emitting circuit substrate, amounting surface is formed on only a surface on the opening portion side, and on the light receiving circuit substrate, a mounting surface is formed on both surfaces.

According to the such like configuration, it is possible to form the light emitting circuit substrate which is disposed so as to be overlapped with the optical system relatively larger, and therefore, a mounting surface is formed only on a surface on its opening portion side, and it is not possible to form the light receiving circuit substrate which is disposed in an area other than an area in which the optical system is disposed on a mounting surface so much larger as compared with the light emitting circuit substrate, and therefore, mounting surfaces are formed on its both surfaces. By this means, it is possible to ensure sufficient mounting surfaces on both of the light emitting circuit substrate and the light receiving circuit substrate. By realizing single surface mounting of the light emitting surface substrate, need to ensure a clearance for electronic component mounting is eliminated, and therefore, it is possible to reduce a thickness of a sensor main body much more.

A reflection type photoelectric switch according to the present disclosure comprises shield members mounted on the light emitting circuit substrate and the light receiving circuit substrate, respectively.

In particular, in case that the light emitting element is a laser diode (LED), an APC circuit is required, and therefore, a control circuit, which is mounted on the light emitting circuit substrate, includes more electric components to be shielded, than a control circuit which is mounted on the light receiving circuit substrate. This is because there is need to prevent erroneous light emission of the light emitting element due to noises and static electricity, and excessive light emission, and in particular, terminals of a variable resistor and a light emitting elements have high necessity of shield. By disposing a control circuit of a light emitting element only on a single surface of the light emitting circuit substrate, it is possible to shield electric components which are included in a control circuit of a light emitting element, by one shield member collectively. In addition, by disposing electric components to be shielded among electric components which are included in a control circuit of a light receiving element, on a single surface (e.g., a surface on the opening portion side) of the light receiving circuit substrate, it is possible to shield electric components which are included in a control circuit of a light receiving element by one shield member. Therefore, it is possible to shield each electric component by lesser shield member, and therefore, it is possible to configure a switch main body cheaper. As a matter of course, in case that LED etc. are used, a light receiving circuit should be shielded more.

In the reflection type photoelectric switch according to the present disclosure, the light emitting circuit substrate and the light receiving circuit substrate are configured by a hard substrate.

According to the such like configuration, by disposing the light emitting circuit substrate and the light receiving circuit substrate, each of which is composed of a hard substrate, respectively, in the first casing in a two-tier fashion, it is possible to ensure a sufficient mounting surface even if a flexible substrate is not used. Therefore, by using a hard substrate such as a glass epoxy substrate but not an expensive circuit substrate like a flexible substrate, it is possible to configure a switch main body inexpensively.

In the reflection type photoelectric switch according to the present disclosure, a thorough-hole for inserting a fixing tool on the occasion of fixing the reflection type photoelectric switch is formed in the second casing.

According to the such like configuration, by forming the through-hole for inserting a fixing tool in the second casing but not in the first casing, it is possible to ensure a space for carrying out, focus adjustment of a light emitting element by use of a jig in the first casing, at the time of fabrication, and therefore, workability at the time of fabrication is improved. In addition, by forming the through-hole in the second casing, even on the occasion of optic axis adjustment and solder-mounting of a light emitting optical system on the first casing, its work is not blocked, and workability is improved.

Various implementations may include one or more the following advantages. For example, a control circuit of a light emitting element and a control circuit of a light receiving circuit are mounted on a light emitting circuit substrate and a light receiving circuit substrate in a divided fashion, and they are disposed in a two-tier fashion in a first casing, and one of them is overlapped with at least a part of an optical system, and thereby, it is possible to a wider range mounting surface in a small space, and therefore, it is possible to miniaturize a switch main body. In addition, simply by changing a disposal configuration of components other than components of an optical system in a switch main body, it is possible to miniaturize the switch main body without miniaturizing the optical system more than necessity, and therefore, it is possible to prevent lowering of detection accuracy which goes with miniaturization of the optical system, and it is possible to detect an object with high accuracy. In addition, even in case that the optical system is miniaturized without lowering optical performance, miniaturization in an entire photoelectric switch is not blocked.

In addition, even in case that a switch main body is miniaturized, it excels at points of workability at the time of adjusting an irradiated light amount of a light emitting element, ensuring of a sufficient mounting surface in both of a light emitting circuit substrate and a light receiving circuit substrate, workability at the time of shielding each electric component by a shield member, ensuring of a sufficient mounting surface in a first casing, and so on.

In addition, if a hard substrate such as a glass epoxy substrate, but not an expensive circuit substrate like a flexible substrate, is used, it is possible to configure a switch main body inexpensively, and by disposing two hard substrates in a first casing in two-tier fashion, it is possible to ensure a sufficient mounting surface even if a flexible substrate is not used.

Other features and advantages maybe apparent from the following detailed description, the accompanying drawings and the claims.

BRIEF DESCRIPTION OF THE DRAWINGS

FIG. 6(b) is a perspective view from the light emitting element side of a light emitting lens of FIG. 3.

FIG. 8 (a) is a view which schematically shows intensity distribution of laser light on the occasion of passing through each light emitting lens of FIG. 7(a).

FIG. 8(b) is a view which schematically shows intensity distribution of laser light on the occasion of passing through each light emitting lens of FIG. 7(b).

DETAILED DESCRIPTION

Figure 1:
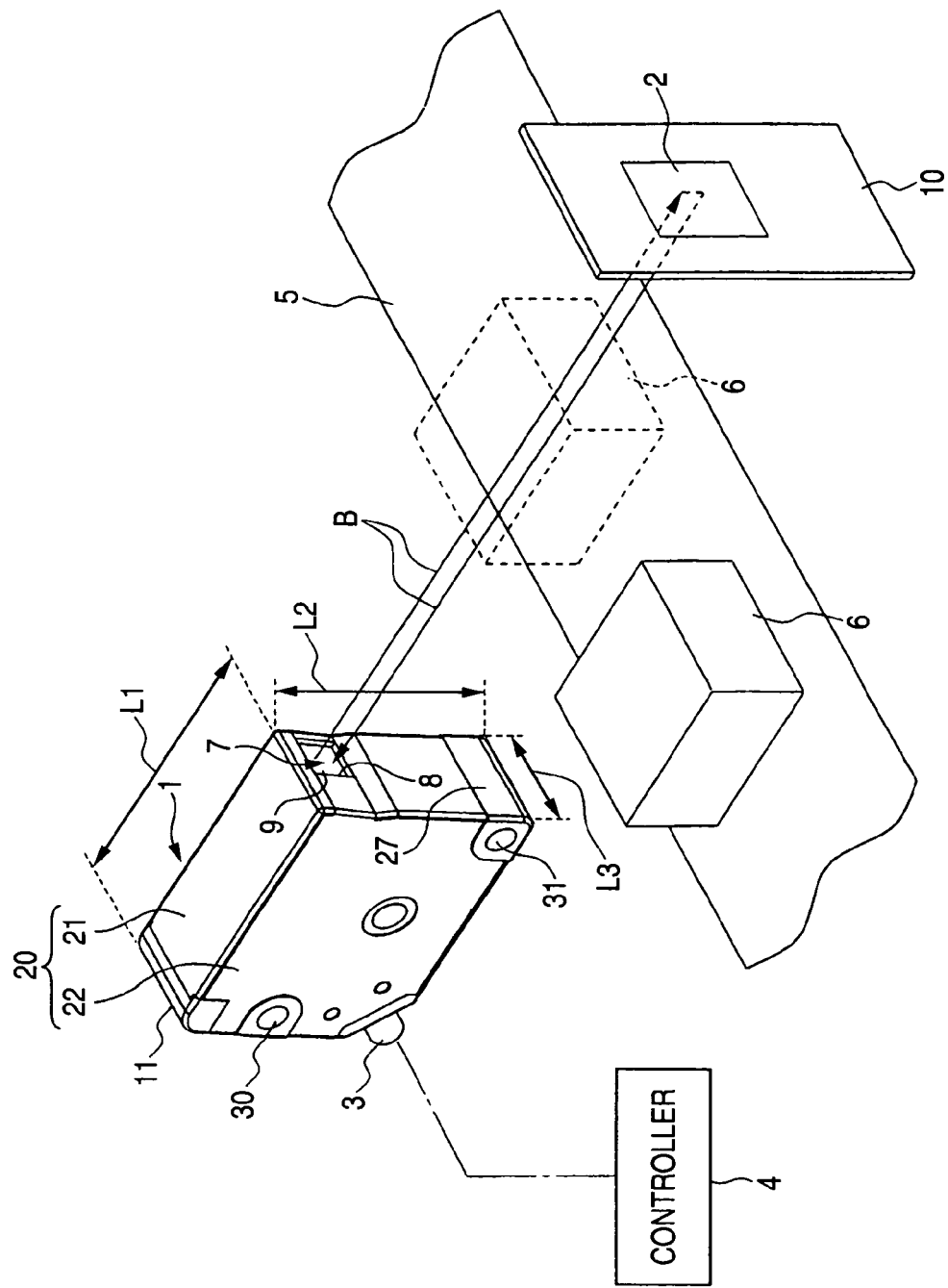
FIG. 1 is a schematic view which shows one configuration example of a regressive reflection type photoelectric switch according to an embodiment of the present invention.

FIG. 1 is a schematic diagram which shows one configuration example of a regressive reflection type photoelectric switch according to an embodiment of the present invention. As shown in FIG. 1, this regressive reflection type photoelectric switch comprises a switch main body 1, a regressive reflection plate 2, and a controller 4. The switch main body 1 irradiates laser light B from a light emitting element and receives its reflected light by a light receiving element. The regressive reflection plate 2 reflects laser light B irradiated from the switch main body 1. The controller 4 is connected to the switch main body 1 through a cable 3 to control an operation of the switch main body 1.

This regressive reflection type photoelectric switch is disposed in a factory etc., and for example as shown in FIG. 1, used for detecting an object 6 which is conveyed on a belt conveyor 5. The switch main body 1 and the regressive reflection plate 2 are disposed so as to sandwich a conveying path of the object 6, and laser light B is irradiated so as to intersect with the conveying path, heading off from the switch main body 1 toward the regressive reflection plate 2. At the time of detection by this photo electric switch, an indicating lamp 11, which is attached to the switch main body 1, is turned on, and thereby, it is notified that it is in a detecting state.

When the object 6 does not exist between the switch main body 1 and the regressive reflection plate 2, laser light B, which was irradiated from the switch main body 1, reaches to the regressive reflection plate 2 without being blocked by the object 6. Then, laser light B, which is reflected by the regressive reflection plate 2, is inputted form a light receiving surface 7 formed on a side surface of the switch main body 1 to an inside of the switch main body 1. In this embodiment, the light receiving surface 7 is configured by a transparent plate 9 such as an acrylic plate, which was fitted into a nearly rectangular opening 8 formed on a side surface of the switch main body 1. Laser light B, which is irradiated from the switch main body 1, also passes through this transparent plate 9 and heads off to the regressive reflection plate 2. The regressive reflection type photoelectric switch of this embodiment is so-called coaxial regressive reflection type photoelectric switch in which irradiated laser light B is reflected by the regressive reflection plate 2 and thereby, its traveling direction of laser light B is changed by nearly 180°, and returned coaxially.

The regressive reflection plate 2 is formed in the nearly rectangular shape, and its outer circumference is held by a holding plate 10. The regressive reflection plate 2 is mounted at a predetermined mounting position through this holding plate 10. This regressive reflection plate 2 has such a well-known configuration that a three-dimensional reflection surface was formed by such a matter that a lot of protruding portions of a three-dimensional shape such as a polyangular cone shape (e.g., square cone shape or hexagonal cone shape) and a spherical shape are disposed on a surface on such a side that they are disposed opposite to the switch main body 1. The laser light B, which is irradiated from the switch main body 1, is so-called P polarized light (linear polarized light), and an angle of a polarization plane is changed by 90° on the occasion that the P polarized light is reflected by the regressive reflection plate 2, and thereby, it becomes so-called S polarized light (linear polarized light). In the following, it will be explained about such a case that irradiated light from the switch main body 1 is P polarized light and reflected light from the regressive reflection plate 2 is S polarized light. However, this is one example, and it is all right even if irradiated light from the switch main body 1 is S polarized light and reflected light from the regressive reflection plate 2 is P polarized light.

The light receiving element in the switch main body 1 receives reflected light, only in such a case that reflected light, which is inputted from the light receiving surface 7, is S polarized light. Therefore, if the object 6 does not exist between the switch main body 1 and the regressive reflection plate 2, relatively considerable amount of light received is obtained by the light receiving element, by such a matter that reflected light (S polarized light) from the regressive reflection plate is received by the light receiving element. On the one hand, as shown by a broken line in FIG. 1, in case that the object 6 exists between the switch main body 1 and the regressive reflection plate 2, reflected light is not almost received in the light receiving element. That is, a mirror surface object exists in between the switch main body 1 and the regressive reflection plate 2, P polarized light irradiated from the switch main body 1 does not become S polarized light on the occasion that it is reflected by a mirror surface, and it is reflected as P polarized light without change. Therefore, the reflected P polarized light is not almost received by the light receiving element. In addition, in case that a non-mirror surface object exists in between the switch main body 1 and the regressive reflection plate 2, P polarized light irradiated from the switch main body 1 is not reflected sufficiently by the object, and therefore, reflected light is not almost received by the light receiving element. In this way, according to the regressive reflection type photoelectric switch, in case of either one of a mirror surface object and a non-mirror surface object, it is possible to detect an object favorably on the basis of lowering of an amount of light received in the light receiving element.

Figure 2:
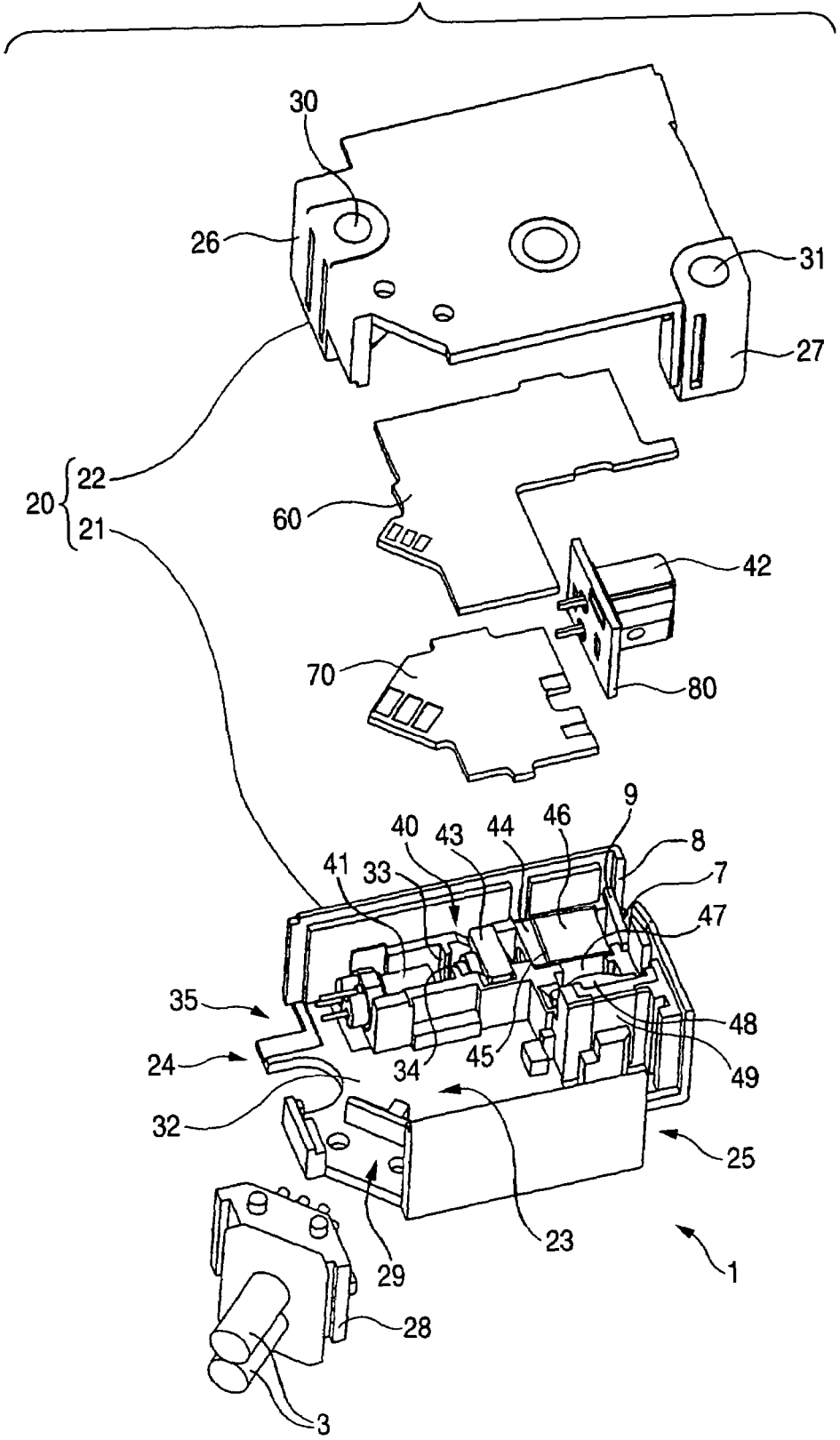
FIG. 2 is an exploded perspective view of a switch main body of FIG. 1.

FIG. 2 is an exploded perspective view of the switch main body 1 of FIG. 1. In the following, for convenience of an explanation, it will be explained on such a premise that an upper side in FIG. 1 is an up direction, and a lower side is a down direction, and a left side is a left direction, and a right side is a right direction.

As to this switch main body 1, its outer shape is laid out by a casing 20 formed in a nearly hollow rectangular solid shape. The casing 20 is formed by connecting a first casing 21 and a second casing 22 each other by adhesive agent. The first casing 21 is a box shaped member of a nearly rectangular shape when it is viewed on a plane surface, in which opening portions 23, 24, 25 are formed on its upper surface, left surface and right front side corner portion, respectively. The second casing 22 is a plate shaped member of a nearly rectangular shape when it is viewed on a plane surface, which corresponds to the opening portion 23 on an upper surface of the first casing 21. On a left side edge and right front side corner portion of the second casing 22, protruding portions 26, 27, which correspond to the opening portions 24, 25 of the first casing 21 respectively, are formed so as to be protruded toward a lower side. Therefore, by mounting the second casing 22 from an upper side so as to cover the opening portion 23 on the upper surface of the first casing 21, it is possible to close the casing 20, except a connector mounting opening 29 for mounting a connector 28 which connects the cable 3 to the switch main body 1, a indicating lamp mounting opening 35 for mounting the indicating lamp 11 and an opening 8 in which the transparent plate 9 is fitted.

In the protruding portions 26, 27 of the second casing 22, through-holes 30, 31, which run through in up and down directions respectively, are formed. By inserting fixing tools such as bolts, into these through-holes 30, 31 to be mounted on a predetermined mounting positions, it is possible to fix the switch main body 1. By forming through-holes 30, 31 in the second casing 22, it is possible to form the opening portions 24, 25 at positions which correspond to the protruding portions 26, 27 of the first casing 21. Therefore, it is possible to carry out focus adjustment of the light emitting element by utilizing the opening portion 24, at the time of fabrication, and therefore, workability at the time of fabrication is improved.

In the first casing 21, components such as an optical system 40, a light emitting circuit substrate 60, a light receiving circuit substrate 70, and a holding substrate 80, are disposed. The optical system 40 includes a light emitting element 41 and a light receiving element 42 and performs irradiation of laser light and light reception. On the light emitting circuit substrate 60, a control circuit of the light emitting element 41 is mounted. On the light receiving circuit substrate 70, a control circuit of the light receiving element 42 is mounted. The holding substrate 80 is connected to the light receiving circuit substrate 70 and holds the light receiving element 42. The optical system 40 includes a light emitting lens 43, a light emitting slit plate 44, a light emitting polarization plate 45, a beam splitter 46, the transparent plate 9, a light receiving polarization plate 47, a light receiving lens 48 and a light receiving slit plate 49, in addition to the light emitting element 41 and the light receiving element 42. These components are incorporated from an upper side to the first casing 21, and thereby, workability at the time of fabrication is improved.

An inner bottom surface of the first casing 21 configures a mounting surface 32 for mounting each component of the optical system 40 and the light receiving circuit substrate 70. On the mounting surface 32, a plurality of ribs, which are protruded toward an upper side, are formed, and by these plural ribs, mounting positions for fitting and mounting each component of the optical system 40 and the light receiving circuit substrate 70 are formed. Components other than the light emitting element 41 among respective components of the optical system 40 and the light receiving circuit substrate 70 are inserted in the firs casing 21 through the opening portion 23 from an upper side, and mounted on the mounting surface 32. On the one hand, the light emitting element 41 is inserted in the first casing 21 from the opening portion 24 toward a right side, and mounted on the mounting surface 32.

The light emitting element 41, the light emitting lens 43, the light emitting slit plate 44, the light emitting polarization plate 45, the beam splitter 46 and the transparent plate 9 (hereinafter, these things are collectively referred to as "light emitting optical system") are disposed in this order, along a rear inner side surface of the first casing, toward an irradiation direction (right direction) of laser light from the light emitting element 41. Here, the rear inner side surface configures a rearward outer circumference wall inner surface of the first casing 21, and the light emitting optical system is mounted on the ribs formed along a rear inner side surface which is an outer circumference wall, respectively. The light receiving polarization plate 47, the light receiving lens 48, the light receiving slit plate 49 and the light receiving element 42 (hereinafter, these things are collectively referred to as "light receiving optical system".) are disposed in this order, along a right inner side surface of the first casing, toward a front side to the beam splitter 46. Here, the right inner side surface configures a rightward outer circumference wall inner surface of the first casing 21, and the light receiving optical system is mounted on ribs formed along a right inner side surface which is an outer circumference wall, respectively.

By this means, each component of the optical system 40 is disposed in a nearly L shape, along a rear inner side surface and a right inner side surface of the first casing 21, in the first casing 21. In other words, a rearward side surface, and a rightward side surface having an edge which intersects with this surface, are formed on the first casing 21, and in a nearly L shaped space adjacent to these side surfaces, the optical system 40 is disposed in a consolidated fashion. By this means, a disposal area of a circuit etc. other than the optical system 40 is secured as a single space at a maximum, without disposing them in a divided fashion. In addition, by disposing the connector 28 for mounting the cable at a position facing to its intersection point, a distance between the circuit and the connector is shortened, and therefore, effective wiring becomes possible. Furthermore, by disposing the indicating lamp 11 at such a position that a leftward side surface and a rearward side surface intersect with each other, it is possible for a worker to check a detection status from a rear side and an upper side, left and right directions, even after a photoelectric switch was disposed on a factory facility etc., and therefore, visibility is improved.

In addition, by the disposal as described above, it is possible to input only parallel light to the beam splitter 46, in case of either one of light emission and light reception. By this means, it is possible to input all light rays to a light polarization film 53 by an incident angle of nearly 45°, and spectroscopic efficiency of P polarized light and S polarized light is improved. There is such a case that regular reflected light reflected by a mirror surface (reflected light in which light polarization does not change), which should not pass through the beam splitter 46 and the light receiving polarization plate 47 normally, reaches to the light receiving element 42. Therefore, by inputting all light rays to a light polarization film 53 by an incident angle of nearly 45°, it is possible to carry out passage and reflection of light on the light polarization film 53 favorably.

In addition, by disposing the light emitting lens 43 between the light receiving element 41 and the beam splitter 46, and disposing the light receiving lens 48 between the light receiving element 42 and the beam splitter 46, it is possible to prevent disturbance of polarized light by double refraction on the occasion of passing through the lenses 43, 48, and by this means, spectroscopic efficiency of P polarized light and S polarized light is improved. For example, in case that, by use of one lens in common, the light emitting optical system is disposed to this lens, in the order to the lens, the beam splitter and the light receiving element, and the light receiving optical system is disposed in the order of the lens, the beam splitter, and the light receiving element, there is such a case polarized light is disturbed by such a matter that reflected light reflected by a mirror surface passes through the lens, when double refraction occurs in the lenses. In this case, reflected light, in which polarized light is disturbed by passing through the lens, is inputted to the beam splitter, and light, which should not be reflected by a light polarization film normally, is reflected, and reaches to the light receiving element. According to this embodiment, it is possible to prevent disturbance of polarized light due to double refraction on the occasion of passing through the lenses 43, 48, and therefore, it is possible to prevent occurrence of such a matter that reflected light reflected by a mirror surface reaches to the light receiving element.

The light receiving circuit substrate 70 is disposed so as to face to the mounting surface 32 in an area other than such an area oh the mounting surface 32 that the optical system 40 is disposed, i.e., a left front side area. The holding substrate 80 is mounted so as to stick up on an upper side, along a right side edge of the light receiving circuit substrate 70, and electrically connected to the light receiving circuit substrate 70 by soldering. In order to connect different length terminals of the light receiving element 42 to the light receiving circuit substrate 70, this holding substrate 80 plays a role of pulling out (wiring) those terminals in a horizontal direction.

The light emitting circuit substrate 60 is disposed so as to be overlapped with a part of the optical system 40, viewed from above, on an upper side in an inside of the first casing 21. More concretely, the light emitting circuit substrate 60 is disposed so as to be overlapped with components other than the transparent plate 9, the light receiving slit plate 49 and the light receiving element 42 among respective components of the optical system 40, and the light receiving circuit substrate 70. In this manner, it is desirable that the light emitting circuit substrate 60 is disposed in the same area on a projection plate as at least the light receiving circuit substrate 70, and in such an area that a thing, which interferes, does not exist at a height position of the light emitting circuit substrate 60 in the first casing 21. Although it is needless to say, if the light receiving element 42 etc. are at such a height that they do not interfere with the light emitting circuit substrate 60, it is possible to have them overlapped with the optical system 40 in an optimized area including other conditions. By this means, the light emitting circuit substrate 60 and the light receiving circuit substrate 70 are disposed in a two-tier fashion, with uniformly spacing them each other, in the first casing 21. The connector 28 is electrically connected to the light emitting circuit substrate 60 and the light receiving circuit substrate 70, by soldering, respectively.

In this embodiment, each component of the optical system 40 is mounted on the mounting surface 32, and thereby, disposed in a space of approximately half of a lower side in the first casing 21. Therefore, the light receiving surface 9, which is configured by the transparent plate 9, is disposed in an area of approximately half of the lower side on a right side surface of the first casing 21, and as shown in FIG. 1, it is turned into such a situation that, when the switch main body 1 is viewed from the regressive reflection plate 2 side, the light receiving surface 7 is leaned to one side in a thickness direction of the casing 20 (such a direction that the first casing 21 and the second casing 22 are lined up). By leaning to one side in this way, a margin level in a height direction, by which the light emitting circuit substrate 60 can be overlapped with the optical system 40, is allowed.

Figure 3:
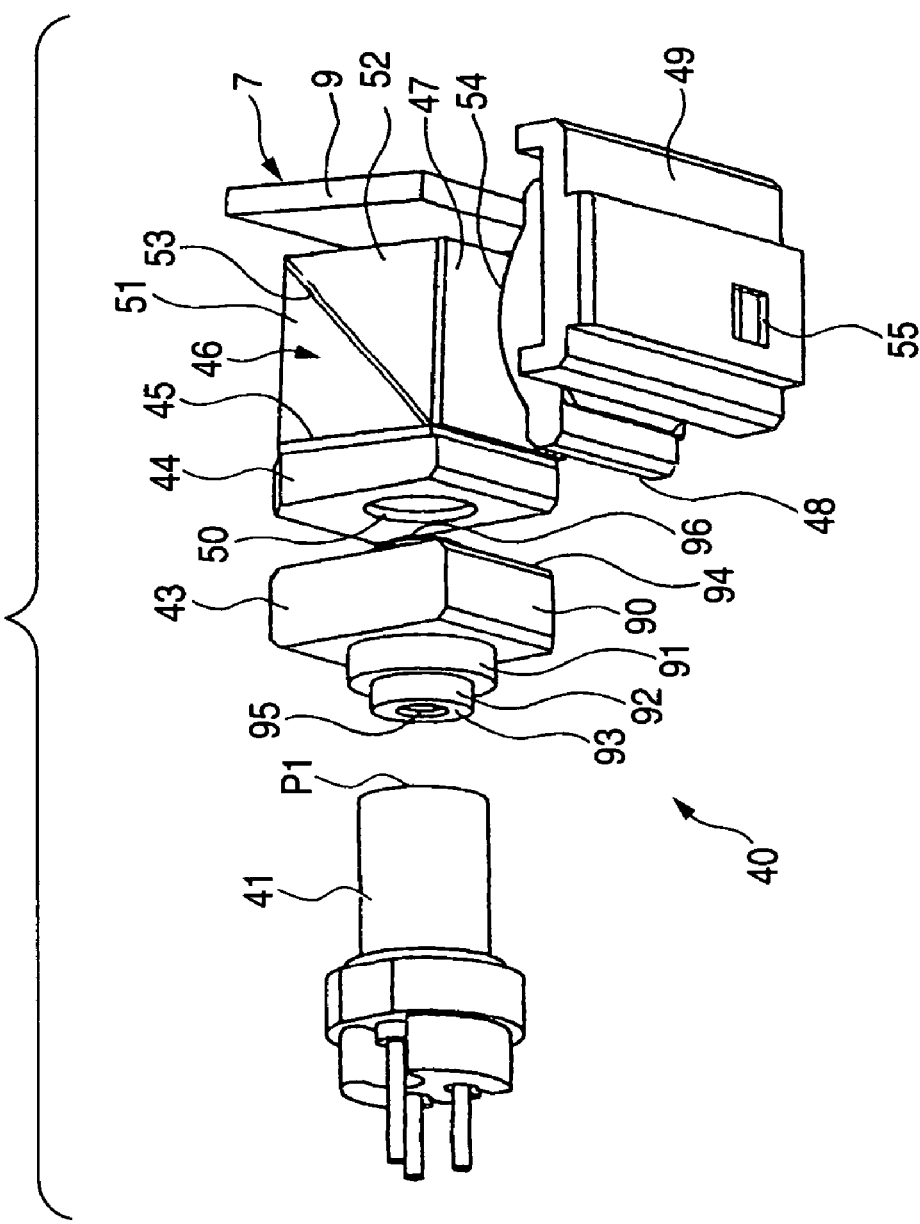
FIG. 3 is a perspective view which shows a configuration of an optical system, and shows it by omitting a light receiving element which is one constituent component of the optical system.
Figure 4:
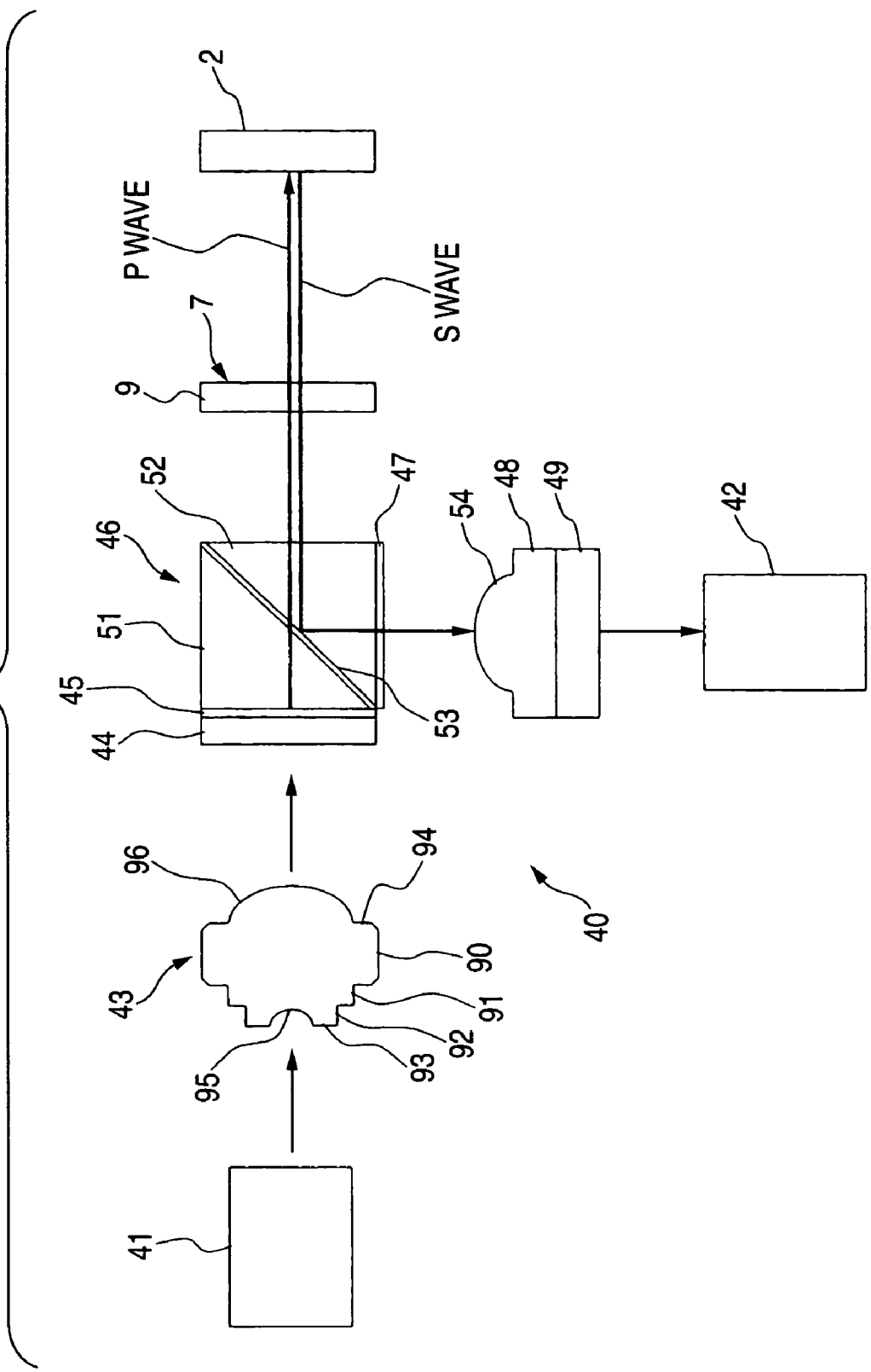
FIG. 4 is a schematic light path view which shows such a light path that laser light irradiated from a light emitting element is received by the light receiving element.

FIG. 3 is a perspective view which shows a configuration of the optical system 40 of FIG. 2, and it is shown by omitting the light receiving element 42 which is one constituent component of the optical system 40. In addition, FIG. 4 is a schematic light path view which shows such a light path that laser light irradiated from the light emitting element 41 is received by the light receiving element 42.

The light emitting element 41 is configured by a laser diode, and irradiates laser light toward a right direction in FIG. 3. The light emitting lens 43 converts the laser light irradiated from the light emitting element 41 into nearly parallel light, and emits it. A part of laser light irradiated from the light emitting lens 43 passes through a nearly circular shaped slit 50 formed in the light emitting slit plate 44, and is guided to the light emitting polarization plate 45. In this way, laser light passes through the slit 50, and thereby, it is possible to limit an irradiation range of laser light to a nearly circular spot shape.

The beam splitter 46 is formed as a nearly cube shape in which a length of one edge is approximately 3.5 mm, by contacting nearly the same two prisms 51, 52 having nearly triangular pole shape and connecting them each other. The light emitting polarization plate 45 contacts to a left side surface of one prism 51, and is sandwiched in between the prism 51 and the light emitting slit plate 44. In addition, the light receiving polarization plate 47 contacts to a front side surface of the other prism 52. Between contact surfaces of the two prisms 51, 52, the light polarization film 53 is sandwiched so as to be extended in a 45° inclined surface to an irradiation direction of laser light.

The light emitting polarization plate 45 allows passage of only P polarized light among laser light inputted. Therefore, only P polarized light, among laser light passed through the slit 50 of the light emitting slit plate 44, passes through the light emitting polarization plate 45, and is inputted to the beam splitter 46. The light polarization film 53 of the beam splitter 46 allows passage of only P polarized light among laser light inputted from the light emitting element 41 side (left side). In this way, laser light passes through the light emitting polarization plate 45 and the light polarization film 53 which allow passage of only P polarized light respectively, and thereby, it is possible to detect only P polarized light from laser light, with high accuracy.

Laser light (P polarized light), which passed through the light polarization plate 53 of the beam splitter 46, is emitted from a right side surface of the beam splitter 46, and passes through the transparent plate 9. By this means, laser light is irradiated from the switch main body 1 toward the regressive reflection plate 2, and if the object 6 does not exist between the switch main body 1 and the regressive reflection plate 2, irradiated laser light is reflected by the regressive reflection plate 2 without being blocked by the object 6. Laser light is converted from P polarized light into S polarized light, as described above, on the occasion that it is reflected by the regressive reflection plate 2.

Reflected light (S polarized light) from the regressive reflection plate is inputted from the light receiving surface 7 to the switch main body 1. The light receiving surface 7 is formed in a nearly square shape in which a length of one edge is approximately 3.5 mm. A distance from an irradiation point P1 of the light emitting element 41 to the light receiving surface 7 is approximately 10 mm. Reflected light, which was inputted from the light receiving surface 7 to the switch main body 1, passes through the transparent plate 9, and reaches to the beam splitter 46. The light polarization film 53 of the beam splitter 46 reflects only S polarized light among laser light inputted from the regressive reflection plate 2 side (right side). Therefore, laser light, which was inputted to a right side surface of the beam splitter 46, is reflected by the light polarization film 53, and thereby, a traveling direction of laser light is changed by 90°, and heads off to the light receiving polarization plate 47 side. The light receiving polarization plate 47 allows passage of only S polarized light among laser light inputted. In this way, laser light is reflected by the light polarization film 53 which reflects only S polarized light, and passes through the light receiving polarization plate 47 which allows passage of only S polarized light, and thereby, it is possible to extract only S polarized light from laser light, with high accuracy.

Figure 5:
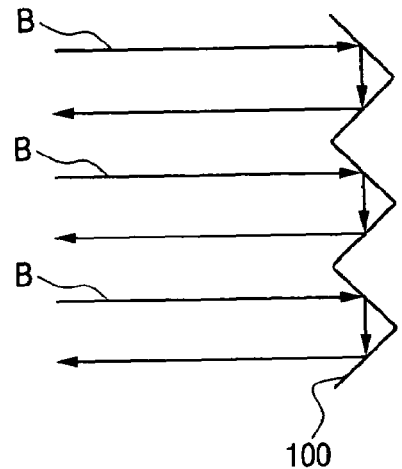
FIGS. 5 (a) to (c) are pattern views each of which shows one example of a reflection mode of laser light in a three-dimensional reflection surface in a regressive reflection plate.
Figure 5:
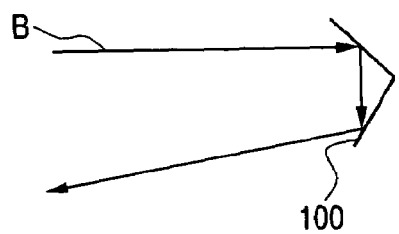
Figure 5:
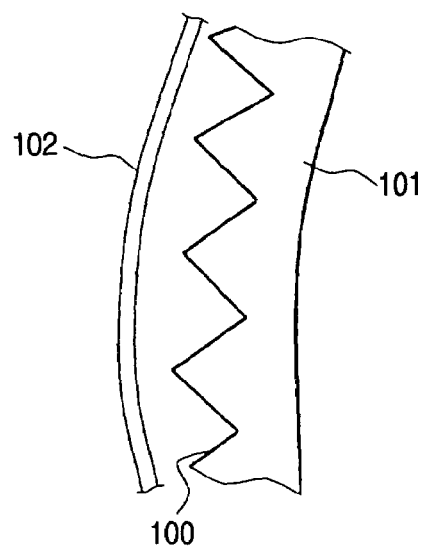

FIGS. 5 (a) and (b) are pattern views each of which shows one example of a reflection mode of laser light on the three-dimensional reflection surface 100 of the regressive reflection plate 2. In an example shown in FIG. 5(a), on the regressive reflection plate 2, the three-dimensional reflection surface 100 is formed by such a matter that a lot of plural protruding portions (so-called sites) of triangular shape in section are disposed. Each site of the three-dimensional reflection surface 100 is configuring a plurality of flat surfaces which intersect with one another by an angle of 90°, and laser light B, which is inputted to the regressive reflection plate 2, is reflected by the three-dimensional reflection surface 100, and thereby, a traveling direction is changed by nearly 180°.

There is fluctuation of accuracy in a reflection angle of laser light in the three-dimensional reflection surface 100 of the regressive reflection plate 2. That is, in an example shown in FIG. 5 (b), because of angular fluctuation of the three-dimensional reflection plate 100, a traveling direction of laser light B, which his inputted to the three-dimensional reflection surface 100, is not converted by an angle of 180° with high accuracy. In addition, in an example shown in FIG. 5(c), because of undulation, which is generated on a base material 101 on which the three-dimensional reflection surface 100 is formed, or is generated on a protective sheet which is attached to the three-dimensional reflection surface 100, angular fluctuation of the three-dimensional reflection surface 100 is generated. Laser light B, which is inputted to the regressive reflection plate, is reflected by the three-dimensional reflection surface, and thereafter, returned over spreading by a, predetermined spread angle, but some errors may be observed partially in a spread angle of laser light B, due to accuracy fluctuation etc. of the reflection angle of laser light as shown in FIGS. 5(b), (c). Therefore, if a receiving surface of reflected light in a switch main body (such a surface that reflected light is inputted to the switch main body) is widened, light reflected by a lot of sites in the three-dimensional reflection surface of the regressive reflection plate is inputted to the switch main body. Thus, an error on the occasion of comparing an amount of light received with a threshold value is small, and it is possible to detect an object with higher accuracy. However, when the light receiving surface of reflected light in the switch main body is widened, an outer shape of the main body becomes large by that much, and therefore, there is such a problem that it is not possible to realize miniaturization of the main body.

In addition, depending on a mounting position of the regressive reflection plate 2, the regressive reflection plate 2 vibrates and a spot position in the regressive reflection plate 2 varies, and it is conceivable that this is a main cause of such a matter that it is not possible to detect an object favorably. In addition, in the such like case, a large error is observed in a spread angle of reflected light at a spot position on the regressive reflection plate 2 and a spread angle and a spreading direction of reflected light from each site change considerably. Therefore, an amount of light from each side fluctuates, and fluctuation of an amount of light received becomes large, and there is such a problem that it is not possible to detect an object favorably.

Laser light (S polarized light), which passed through the light receiving polarization plate 47, is inputted to the light inputting surface 54 of the light receiving lens 48. On the light inputting surface 54 of the light receiving lens 48, a spherical shaped convex curved surface is formed, and laser light is focused by passing through this convex curved surface. A part of laser light, which was focused by passing through the light receiving lens 48, passes through the nearly rectangular shaped slit 55 formed in the light receiving slit plate 49, and is received by the light receiving element 42 which is configured by a photo diode. In this way, laser light passes through the slit 55, and thereby, it is possible to block entrance of disturbance light such as sun light and light from a fluorescent lamp. Data of a received light amount of laser light received by the light receiving element 42 is transmitted-to the controller 4 through the cable 3. The controller 4 comprises CPU (not shown in the figure), and this CPU compares received data of a received light amount with a predetermined threshold value, and thereby, detects presence and absence of the object 6 between the switch main body 1 and the regressive reflection plate 2. That is, CPU judges that the object 6 does not exist if a received light amount is the predetermined threshold value or more, and judges that the object 6 exists if a received light amount is less than the predetermined threshold value.

Dimensions of the switch main body 1 depend on dimensions of each component of the optical system 40 and a disposal configuration, and dimensions of other components such as the light emitting circuit substrate 60, the light receiving circuit substrate 70 and the holding substrate 80, and disposal configurations, etc. The switch main body 1 of this embodiment is miniaturized very much as compared to a conventional one, in such a manner that a length L1 along an irradiation direction from the light emitting element 41 is set to approximately 23 mm, and a length L2 along a light emitting direction to the light receiving element 42 is set to approximately 18 mm, and a length L3 in a direction (thickness direction) intersecting with these directions L1, L2 is set to approximately 8.5 mm, as shown in FIG. 1, by devising these dimensions and disposal configurations.

Figure 6:
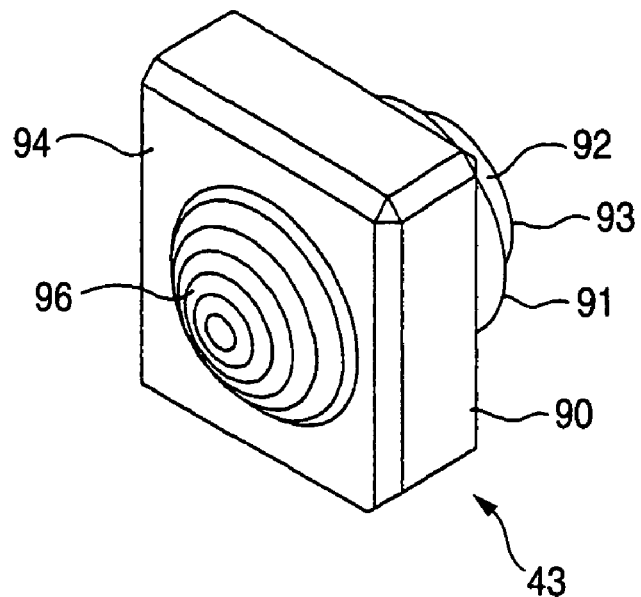
FIG. 6 (a) is a perspective view from the side opposite to the light emitting element of a light emitting lens of FIG. 3.
Figure 6:
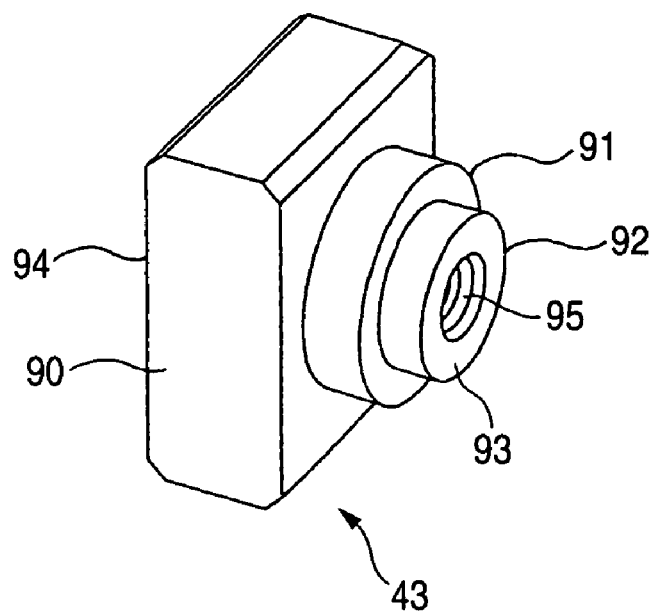

FIGS. 6 (a) and (b) are perspective views of the light emitting lens 43 of FIG. 3. FIG. 6(a) shows a perspective view from the side opposite to the light emitting element 41, and FIG. 6(b) shows a perspective view from the light emitting element 41 side. This light emitting lens 43 is configured in such a manner that a main body portion 90, a nearly circular pole shaped first protruding portion 91, and a nearly circular pole shaped second protruding portion 92, are integrally molded by transparent resin or glass. The main body portion 90 is formed in a nearly rectangular shape when it is viewed on a plane surface, from the light emitting element 41 side. The nearly circular pole shaped first protruding portion 91 is protruded from a surface of this main body portion 90 on the side of the light emitting element 41 toward the light emitting element 41 side. The nearly circular pole shaped second protruding portion 92 is protruded on the same axis line from a surface of this first protruding portion 91 on the side of the light emitting element 41 toward the light emitting element 41 side, and is of a smaller diameter than that of the first protruding portion 91. On a step portion formed by the second protruding portion 92, it is possible to dispose a slit for blocking such a matter that light is inputted to a portion other than a concave curved surface 95 of a light inputting surface 93, which will be described later.

A surface of the second protruding portion 92 on the side of the light emitting element 41 configures the light inputting surface 93 to which laser light, that was irradiated from the light emitting element 41, is inputted. In addition, a surface of the main body portion 90 on the side opposite to the light emitting element 41 configures the light emitting surface 94 which converts laser light into nearly parallel light and emits it. A distance of the light inputting surface 93 and the light emitting surface 94 is approximately 2.7 mm. On the light inputting surface 93, the spherical shaped concave curved surface 95, which is concave to the side opposite to the light emitting element 41, is formed. On the one hand, on the light emitting surface 94, a spherical shaped convex curved surface 96, which overhangs to the side opposite to the light emitting element 41, is formed.

The concave curved surface 95 is of a nearly circular shape with a diameter of approximately 0.78 mm when it is viewed on a plane surface from the light emitting element 41 side, and a curvature radius is approximately 0.53 mm. On the one hand, the convex curved surface 96 is of a nearly circular shape with a diameter of approximately 2.6 mm when it is viewed on a plane surface from the side opposite to the light emitting element 41, and a curvature radius is approximately 1.96 mm. In this manner, when it is viewed on a plane surface, an area of the concave curved surface 95 is formed so as to become smaller than an area of the convex curved surface 96. It is preferable that a diameter of the concave curved surface 95 is approximately one third through one fourth of a diameter of the convex curved surface 96. This is because it is not possible to measure surface accuracy in relation to another measurement device, unless the above-mentioned diameter range is not satisfied, from a viewpoint of molding a lens. In addition, when a displacement error is taken into consideration, in order to carry out light blocking of a portion other than the concave curved surface 95 by black silk printing, it is reasonable to form the concave curved surface 95 with the above-mentioned diameter range. The concave curved surface 95 and the convex curved surface 96 are disposed in such a manner that respective center axis lines are allocated on the same straight line along an irradiation direction of laser light.

Further, in the embodiment, the concave curved surface 95 and the convex curved surface 96 are composed of the a spherical lens.

Figure 7:
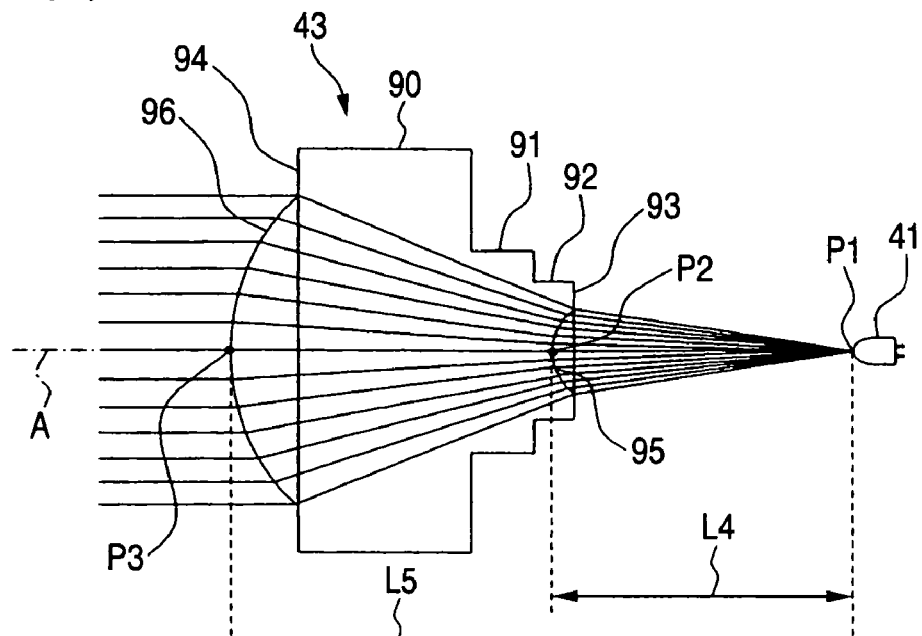
FIG. 7(a) is a schematic light path view which shows an appearance of laser light on the occasion of passing through the light emitting lens of the embodiment of the present invention.
FIG. 7(b) is a schematic light path view which shows an appearance of laser light on the occasion of passing through the light emitting lens of the related art.
Figure 7:
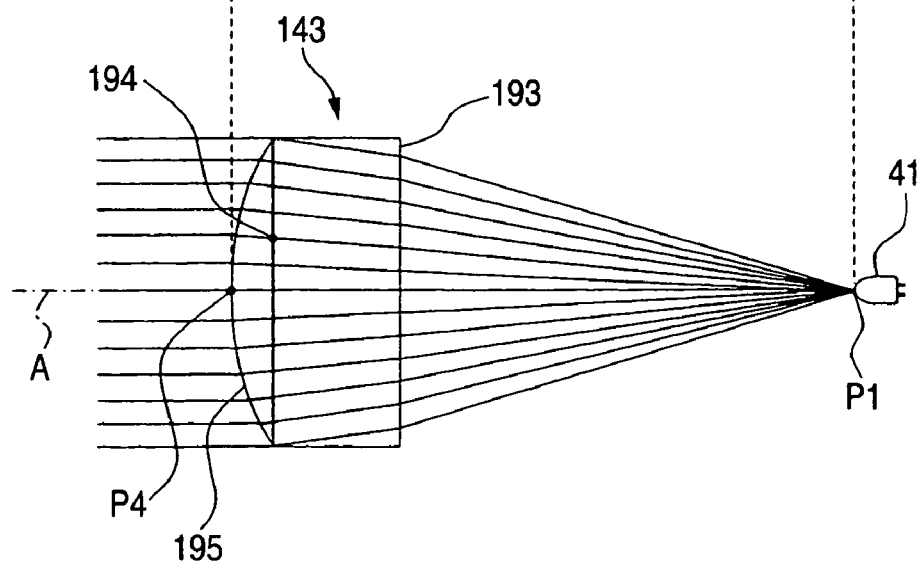

FIGS. 7(a) and (b) schematic light path views each of which shows an appearance of laser light on the occasion of passing through the light emitting, lenses 43, 143. FIG. 7(a) shows a case by use of the light emitting lens 43 in this embodiment and FIG. 7(b) shows a case by use of the light emitting lens 143 in related art. As shown in FIG. 6, laser light, which is irradiated from the light emitting element 41, is inputted to the light emitting lenses 43, 143 over spreading by a predetermined angle (spread angle) to its optic axis A.

In FIG. 7(a), laser light, which was irradiated from the light emitting element 41, is inputted to the concave curved surface 95 of the light inputting surface 93. A spread angle of laser light is enlarged on the occasion of inputting from the concave curved surface 95 to an inside of the light emitting lens 43, and passes through an inside of the light emitting lens 43 by the enlarged spread angle. A shape (diameter) of the convex curved surface 96 of the light emitting surface 94 is set up so as to corresponds to such a range that laser light, in which a spread angle was enlarged by the convex curved surface 95, reaches to the light emitting surface 94, in case that laser light is inputted to the entire convex curved surface 95 of the light inputting surface 93. Therefore, almost all of laser light, which reached from the light inputting surface 93 to the light emitting surface 94, is emitted through the convex curved surface 96. As to laser light emitted from the light emitting lens 43, a spread angle is reduced on the occasion that it passes through the convex curved surface 96, and becomes nearly parallel light. A distance L4 from an irradiation point of the light emitting element 41 up to a bottom point P2 of the concave curved, surface 95 is approximately 3 mm. In addition, a distance L5 from the irradiation point P1 of the light emitting element 41 up to a top point P3 of the convex curved surface 96 is approximately 6 mm.

The light emitting lens 143 of related art shown in FIG. 7(b) has such a shape that the light inputting surface 193 on the light emitting element 41 side is formed by a flat surface, and a convex curved surface 195 is formed on a light emitting surface 194 on the side opposite to the light emitting element 41. A distance of the light inputting surface 193 and the light emitting surface 194 is approximately 1.3 mm. In addition, the convex curved surface 195 is of a nearly circular shape with a diameter of approximately 2.6 mm when it is viewed on a plane surface from the light emitting element 41 side, and a curvature radius is approximately 3.5 mm. A distance from the irradiation point P1 of the light emitting element 41 up to a top point P4 of the convex curved surface 195 is approximately 6 mm which is the same as the distance L5 from the irradiation point P1 up to the top point P3 of the convex curved surface 96 in the light emitting lens 43 of FIG. 7(a). In this regard, however, as the light emitting lens of related art, in addition to a thing of such a shape that the light inputting surface 193 is formed by a flat surface as described above and the convex curved surface 195 is formed on the light emitting surface 194, a thing of such a shape that a convex curved surface is formed on a light inputting surface and a light emitting surface is formed by a flat surface has been also known.

In FIG. 7(b), laser light, which was irradiated from the light emitting element 41, is inputted to the light inputting surface 193 which is composed of a flat surface, and passes through an inside of the light emitting lens 143 without almost no change of its spread angle. Then, as to laser light reached to the convex curved surface 195 of the light emitting surface 194, a spread angle is reduced on the occasion of passing through the convex curved surface 195, and it becomes nearly parallel light. Each light emitting lens 43, 143 shown in FIGS. 7(a) and (b) has a different shape, respectively, but an irradiation range of nearly parallel light, which is emitted from each light emitting surface 94, 194, is almost the same.

FIGS. 8(a) and (b) views each of which schematically shows intensity distribution of laser light on the occasion of passing through each light emitting lens 43, 143 of FIGS. 7(a) and (b). FIG. 8(a) shows a case by use of the light emitting lens 43 of this embodiment, and FIG. 8(b) shows a case by use of the light emitting lens 143 of related art.

Firstly, the light emitting lens 143 of related art shown in FIG. 8(b) will be explained. In this light emitting lens 143, the light inputting surface 193 is formed by a flat surface, and therefore, as described above, laser light, which was inputted to the light inputting surface 193, reaches to the light emitting surface 194 without almost no change of a spread angle. Laser light has such a characteristic that the more it is proximate to the optic axis A, the more its intensity distribution becomes uniform, and the more it is separated from the optic axis A, the more its intensity distribution becomes non-uniform. If a spread angle is not changed like this light emitting lens 143, laser light reaches to the light emitting surface 194 over keeping a ratio of intensity distribution on the occasion that it was irradiated from the light emitting element 41. Therefore, intensity distribution of laser light, which reached to the light emitting surface 194, is uniform to a certain degree in a range close to the optic axis A, as shown in FIG. 8(b), but shows such intensity distribution that if it is separated from the optic axis A a little bit, intensity comes down rapidly. If a distance of the light emitting element 41 and the light emitting lens 143 is widened, it is possible to make intensity distribution of laser light which reaches to the light emitting surface 194 more uniform, but in case that the above-mentioned distance L5 is set to a constant small value from a constraint due to miniaturization of the optical system 40, non-uniform intensity distribution as shown in FIG. 8(b) is obtained.

On the one hand, in the light emitting lens 43 of this embodiment shown in FIG. 8(a), only laser light in a range S close to the optic axis A, among laser light irradiated from the light emitting element 41, is inputted to the convex curved surface 95 of the light inputting surface 93. Laser light in this range S shows more uniform intensity distribution as compared to laser light in a range other than that (range separated from the optic axis A). In this manner, when only laser light having more uniform intensity distribution in the range S is enlarged by the convex curved surface 95, intensity distribution of laser light reached to the light emitting surface 94 becomes, as shown in FIG. 8(a), intensity distribution in which the uniform range S to the optic axis A was enlarged.

As apparent from the above-mentioned comparison result, according to this embodiment, only laser light close to the optic axis A is inputted, and its spread angle is enlarged, and thereby, it is possible to emit nearly parallel light in which intensity distribution is more uniform, from the convex curved surface 96. If intensity distribution of light, which his emitted from the light emitting lens 43, is uniform, it is possible to reduce an error on the occasion of comparing a received light amount of reflected light with a threshold value, and therefore, it is possible to detect the object 6 with high accuracy, even if the light receiving surface 7 of reflected light in the switch main body 1 is small. In addition, also in case that the regressive reflection plate 2 is vibrating, fluctuation quantity of a received light amount in the light receiving element 32 is few, and it is possible to detect the object 6 favorably. Therefore, even if the switch main body 1 is miniaturized by reducing the light receiving surface 7, it is possible to detect the object 6 with high accuracy.

In addition, in case of such a configuration that the beam splitter 46 is disposed on the same straight line as the light emitting element 41 and the light emitting lens 43, like this embodiment, it is not possible to ensure a very large distance between the light emitting element 41 and the light emitting lens 43, in order to miniaturize the switch main body 1, but by enlarging a spread angle of laser light inputted from the light emitting element 41 to the light emitting lens 43 through the use of the concave curved surface 95, it is possible to obtain nearly parallel light having a sufficient irradiation range on the convex curved surface 96. In addition, by utilizing the concave curved surface 95, it is possible to make intensity distribution in the irradiation range uniform, and therefore, it is possible to obtain the same advantage as in the case that the light emitting element 41 and the light emitting lens 43 are separated in terms of a distance. Therefore, even in case of a configuration equipped with a beam splitter 46, it is possible to realize miniaturization over keeping an irradiation range and intensity distribution in the irradiation range, and it is possible to reduce deviance of an optic axis which goes with enlargement of a distance of the light emitting element 41 and the light emitting lens 43, and therefore, it is possible to provide a small side regressive reflection type photoelectric switch which can detect the object 6 with high accuracy.

In this embodiment, as shown in FIG. 2, the slit 34, through which laser light heading off from the light emitting element 41 to the light emitting lens 43 is formed on the rib 33 disposed between the light emitting element 41 and the light emitting lens 43. This slit 34 has a shape which corresponds to a shape of the concave curved surface 95 of the light emitting lens 43. That is, a shape of the slit 34 is set up in such a manner that it is possible to irradiate laser light only to the concave curved surface 95 of the light emitting lens 43, by such a matter that laser light heading off from the light emitting element 41 to the light emitting lens 43 passes through the slit 34. By this means, it is possible to suppress noises at the time of detection, which are generated by such a matter that laser light is inputted to a portion other than the concave curved surface 95 on the light inputting surface 93 of the light emitting lens 43, and therefore, it is possible to detect the object 6 with higher accuracy. In this way, by adopting the light emitting lens 43 utilizing the above-described concave curved surface 95, miniaturization of the optical system 40 also becomes possible. In addition, there is no case of blocking miniaturization by disposal of the above-described circuit substrate etc., by miniaturization of the optical system 40, and therefore, overall miniaturization of a photoelectric switch becomes possible.

Figure 9:
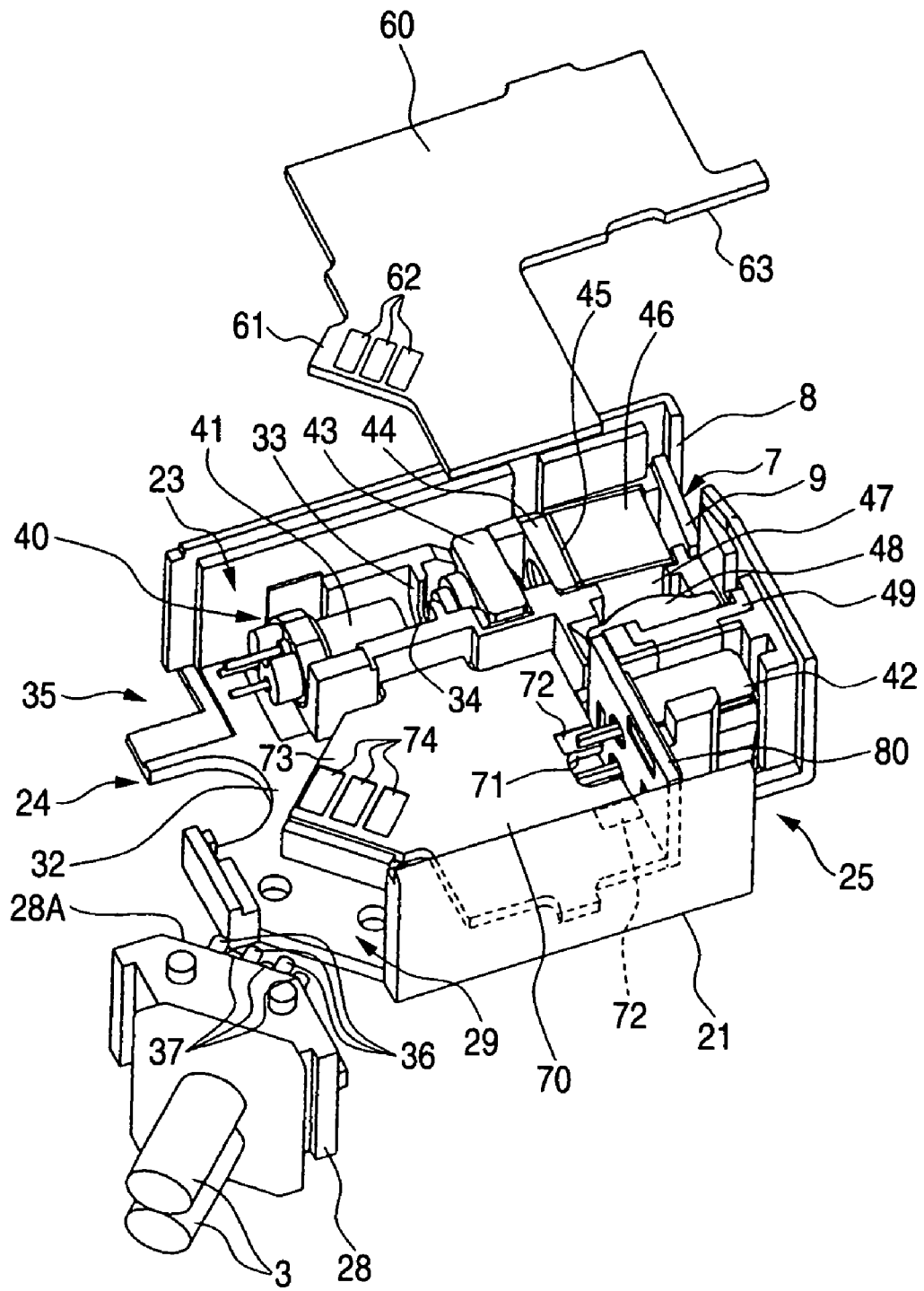
FIG. 9 is a perspective view for explaining about a procedure on the occasion of fabricating the switch main body of FIG. 2, and shows a situation before a light emitting circuit substrate is mounted.
Figure 10:
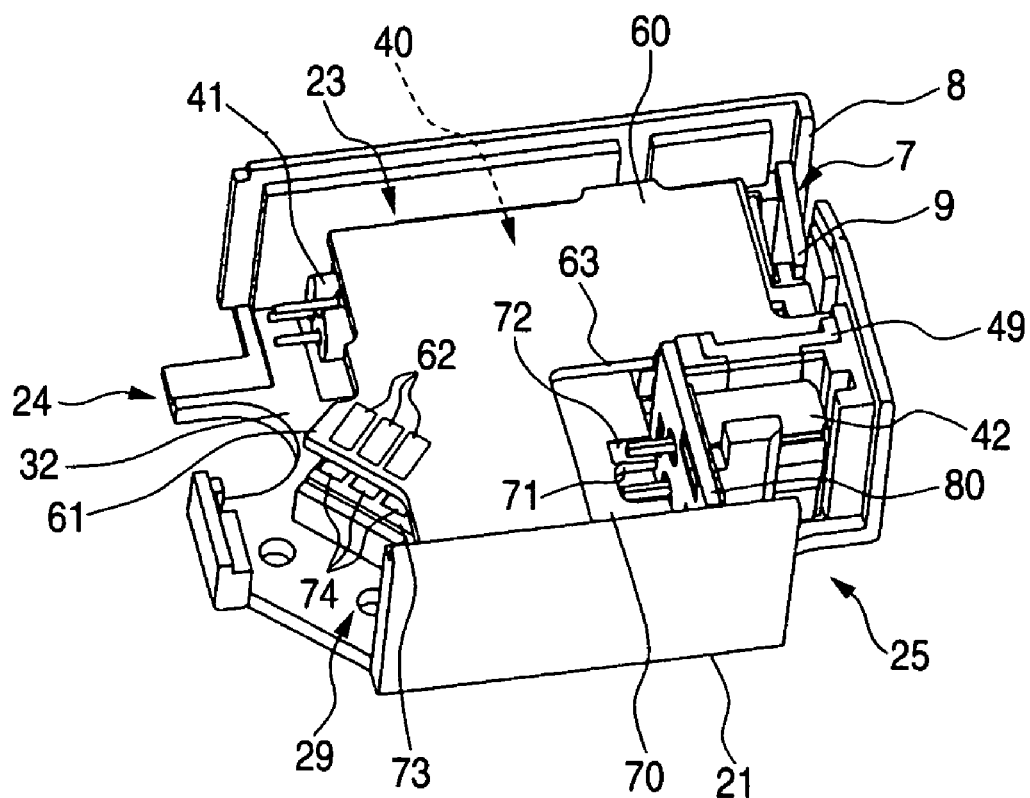
FIG. 10 is a perspective view for explaining about a procedure on the occasion of the switch main body of FIG. 2, and shows a situation after the light emitting circuit substrate is mounted.
Figure 11:
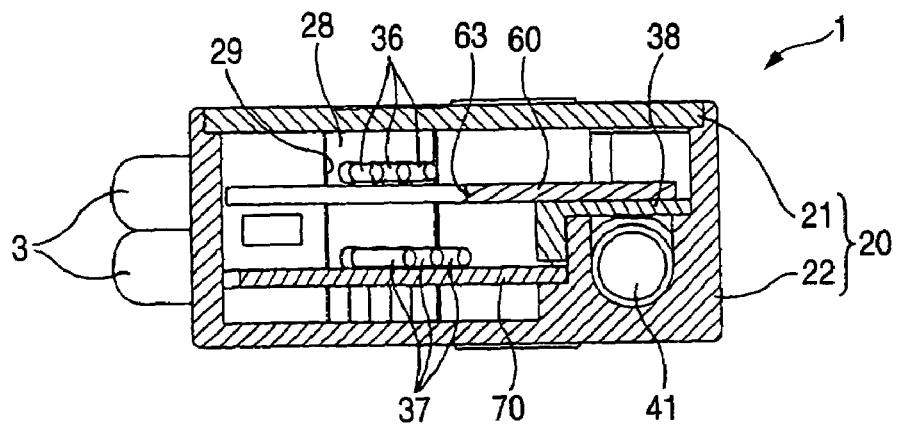
FIG. 11(a) is a view that a vertical cross section along backward and forward directions is viewed from a right side of the switch main body in a fabricated situation.
FIG. 11(b) is a view that a vertical cross section along backward and forward directions is viewed from a left side of the switch main body in a fabricated situation.
Figure 11:
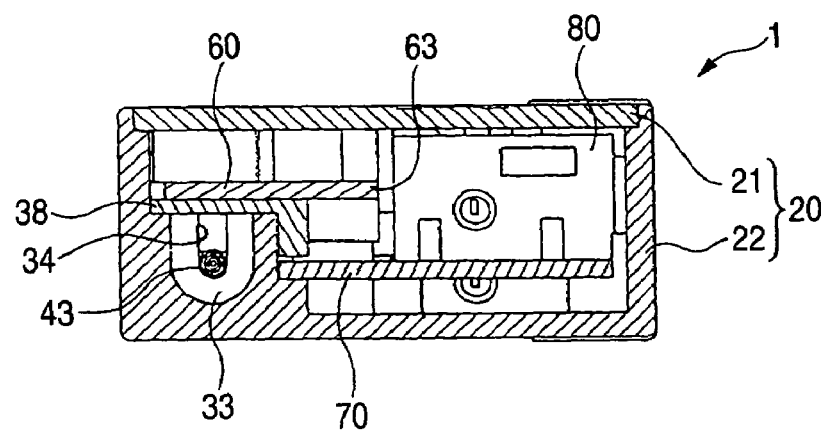

FIGS. 9 and 10 are perspective views for explaining about a procedure on the occasion of fabricating the switch main body 1 of FIG. 2, and in FIG. 10, the connector 28 is omitted. In addition, FIGS. 11 (a) and (b) are vertical cross sectional views of the switch main body 1 in a fabricated situation. FIG. 11 (a) shows such a view that a vertical cross section along backward and forward directions is viewed from a right side, and FIG. 11 (b) shows such a view that a vertical cross section along backward and forward directions is viewed from a left side.

On the occasion of fabricating this switch main body 1, firstly, the transparent plate 9, the light emitting lens 43, the light receiving lens 48, the beam splitter 46, the light emitting slit plate 44 and the light receiving slit plate 49 are inserted in the first casing 21 through the opining portion 23 from above, sequentially, and mounted at a corresponding mounting position on the mounting surface 32. The light emitting lens 43, the light receiving lens 49, the beam splitter 46, the light emitting slit plate 44 and the light receiving slit plate 49 are fixed by press fitting or adhesion from a back surface. The transparent plate 9 is fixed by fitting of the first casing and the second casing 22, but not by press fitting or adhesion. Meanwhile, the light emitting polarization plate 45 and the light receiving polarization plate 47 has been attached on a side surface of the beam splitter 46 in advance.

After that, the light receiving element 42 is inserted from above in the first casing 21 through the opening portion 23. The light receiving element 42 has been mounted on the holding substrate 80 in advance, by such a matter that two connection terminals of different lengths are solder-mounted on the holding substrate 80. When the light receiving element 42 is disposed at a corresponding mounting position on the mounting surface 32, the holding substrate 80, which holds the light receiving element 42, is disposed on the mounting surface 32 with a standing posture toward above.

In this way, components other than the light emitting element 41 among respective components of the optical system 40 is mounted on the mounting surface 32, and thereafter, the light receiving circuit substrate 70 is inserted from above in the first casing 21 through the opening portion 23. On a right side edge of the light receiving circuit substrate 70, a cutout 71 for avoiding a contact by having connection terminals of the light receiving element 42, which have been already disposed in the first casing, passed through at the time of insertion in the first casing 21, is formed. The light receiving circuit substrate 70 is supported at three points by three ribs formed on the mounting surface 32 with the same heights, and as shown in FIG. 9, it is turned into such a situation that the right side edge comes close to the holding substrate 80. In this situation, by solder-mounting two lands 72 formed so as to sandwich the cutout 71 on a right side end portion on an upper surface of the light receiving circuit substrate 70 at a right angle to the orthogonal holding substrate 80, the light receiving circuit substrate 70 and the holding substrate 80 are electrically connected to each other. The holding substrate 80 is positioned by a rib and a groove formed on and in the first casing 21.

After that, the light emitting element 41 is inserted from the opening portion 24 in the first casing 21 toward a right side. The light emitting element 41 is fixed on the mounting surface 32 by so-called UV adhesion (UV cure adhesion), after an optic axis is adjusted by use of an optic axis adjustment jig (not shown in the figure). To connection terminals of the light emitting element 41 fixed in this way, a flexible substrate (not shown in the figure) for electrically connecting the light emitting element 41 and the light emitting circuit substrate 60 is solder-mounted. In order to avoid erroneous light emission of the light emitting element 41 due to noises and static electricity, and excessive light emission, there is high necessity to shield terminals of this light emitting element 41 and a variable resistor 67 which will be described later.

A part of a left end rim of the light receiving circuit substrate 70 has become a protruding portion 73 which protrudes toward a left side in a nearly triangular shape. One edge of the protruding portion 73 faces to the connector mounting opening 29, and three lands 74 are lined up along its one edge. These lands 74 are used for electrically connecting the light receiving circuit substrate 70 to the connector 28.

On a surface on a side which is disposed so as to face to the connector mounting opening 29 for the connector 28, total 6 pins, which are composed of upper side three pins 36 which are disposed in line in a horizontal direction and lower side three pins 37 which are disposed in line in a horizontal direction below these upper side three pins 36, are disposed so as to protrude by two-tier disposal. The upper side three pins 26 are formed with nearly the same predetermined length, respectively. The lower side three pins 37 are formed with nearly the same length, respectively, and formed so as to be longer than the upper side three pins 36.

When the connector 28 is mounted to the connector mounting opening 29 after the light receiving circuit substrate 70 is mounted on the mounting surface 32, the lower side three pins 37 of the connector 28 faces to the three lands 74 of the light receiving circuit substrate 70, respectively, in an adjacent or contacted situation (see, FIG. 11(a)). In this situation, by solder-mounting each pin 37 and corresponding land 74, respectively, the connector 28 and the light receiving circuit substrate 70 are electrically connected to each other. At this time, since the lower side three pins 37 of the connector 28 are formed longer than the upper side three pins 36, the upper side three pins 36 does not interfere with solder-mounting, and workability of solder-mounting can be improved. After that, a shield plate (which will be described later) is mounted at a predetermined position of an upper surface of the light receiving circuit substrate 70, and the shield plate is solder-mounted to the light receiving circuit substrate 70 or the holding substrate 80, and thereby, the shield plate is electrically connected to the light receiving circuit substrate 70 or the holding substrate 80, and its position is fixed.

After mounting of the light receiving circuit substrate 70 is completed in this way, the plate shaped cover member 38 (see, FIG. 11) is mounted from above so as to cover at least a part of the optical system 40. This cover member 38 is formed by for example, block colored resin, and prevents leakage of laser light which passes through the optical system, by covering an upper side of the light emitting element 41, the light emitting lens 43, the light emitting slit plate 44, the light emitting polarization plate 45, the beam splitter 46, the light receiving polarization plate 47 and the light receiving lens 48.

After that, the light emitting circuit substrate 60 is inserted from above in the first casing 21 through the opening portion 23, and thereby, as shown in FIG. 10, disposed so as to be above and face to the light receiving circuit substrate 70 with spacing a certain distance. At this time, the light emitting circuit substrate 60 is slid from a rightward upper side toward a leftward lower side to the opening portion 23, and thereby, its left end portion is inserted so as to gain entrance into a lower side of the upper side three pins 36 of the connector 28.

The light emitting circuit substrate 60 is disposed so as to cover an upper side of the light receiving circuit substrate 70 and the cover member 38. By this means, the light emitting circuit substrate 60 is disposed so as to be overlapped with the light emitting element 41, the light emitting lens 43, the light emitting slit plate 44, the light emitting polarization plate 45, the beam splitter 46, the light receiving polarization plate 47 and the light receiving lens 48 among respective components of the optical system 40, when they are viewed from an upper side. On a right front side corner portion of the light emitting circuit substrate 60, a nearly rectangular shaped cutout 63 is formed, and by this means, the light emitting circuit substrate 60 is formed in a nearly L shape when it is viewed on a plane surface. In such a situation that the light emitting circuit substrate 60 is disposed in the first casing 21, it is turned into such a situation that the light receiving element 42 and the holding substrate 80 overhand to a more upper side than the light emitting circuit substrate 60 through the cutout 63 (see, FIGS. 10 and 11(b)).

A part of a left end rim of the light emitting circuit substrate 60 has become a protruding portion 61 which protrudes toward a left side in a nearly triangular shape. This protruding portion 61 faces to an upper side of the protruding portion 73 of the light receiving circuit substrate 70. One edge of the protruding portion 61 faces to the connector mounting opening 29, and three lands 62 are formed in line along the one side. These lands 62 are used for electrically connecting the light emitting circuit substrate 60 to the connector 28.

In such a situation that the light emitting circuit substrate 60 is disposed in the first casing 21 so as to be inserted in a lower side of the upper side three pins 36 of the connector, the upper side three pins 36 faces to the three lands 62 of the light emitting circuit substrate 60, respectively, in an adjacent or contacted situation (see, FIG. 11(*a*)). In this situation, by solder-mounting each pin 36 and corresponding land 62, respectively, the connector 28 and the light emitting circuit substrate 60 are electrically connected to each other. At this time, a flexible substrate, which is mounted to the light emitting element 41, is also solder-mounted to the light emitting circuit substrate 60, and thereby, the light emitting element 41 is electrically connected to the light emitting circuit substrate 60. After that, a shield plate (which will be described later) is mounted at a predetermined position of an upper surface of the light emitting circuit substrate 60, and the shield plate is solder-mounted to the light emitting circuit substrate 60 and thereby, the shield plate is electrically connected to the light emitting circuit substrate 60, and its position is fixed.

After that, the indicating lamp 11 is mounted to the indicating lamp mounting opening 35, and the second casing is mounted from an upper side so as to cover the opening portion 23 on an upper surface of the first casing 21, and thereby, fabrication of the switch main body 1 is completed.

Figure 12:
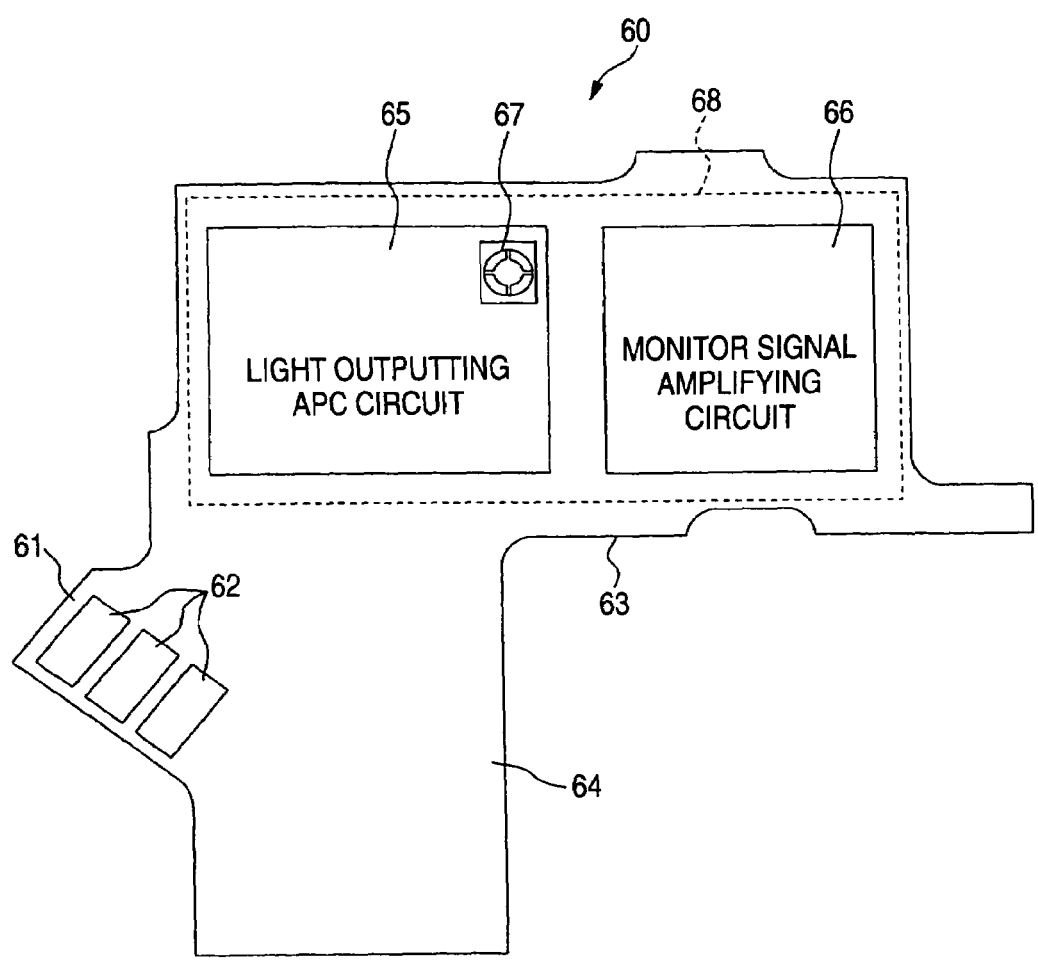
FIG. 12 is a plan view of a light emitting circuit substrate when it is viewed from above.

FIG. 12 is a plan view of the light emitting circuit substrate 60 when it is viewed from above. The light emitting circuit substrate 60 is configured by a hard substrate such as a glass epoxy substrate. On the light emitting circuit substrate 60, a mounting surface 64 is formed only on an upper surface, and a light emitting APC (Auto Power Control) circuit 65 and a monitor signal amplifying circuit 66 are mounted on the mounting surface. The light emitting APC (Auto Power Control) circuit 65 and the monitor signal amplifying circuit 66 are disposed at a rear portion of an upper surface of the light emitting circuit substrate 60, and electrically connected to each other by print wiring which is not shown in the figure, and connected to the land 62.

The monitor signal amplifying circuit 66 amplifies a monitor signal which corresponds to an output value of laser light in the light emitting element 41, and monitors the monitor signal, and thereby, detects an output value of laser light. The light emitting APC circuit 65 carries out control in such a manner that an output value becomes nearly constant, by adjusting an output value of laser light on the basis of a monitor result by the monitor signal amplifying circuit 66. The monitor result by the monitor signal amplifying circuit 66 is also transmitted to the controller 4 through the connector 28 and the cable 3, and the controller 4 detects excessive irradiation etc. of laser light due to failure of the light emitting element 41, on the basis of the received monitor result.

The light emitting APC circuit 65 includes a light emitting portion power supply circuit (not shown in the figure) for electric power supply to each electric component mounted on the light emitting circuit substrate 60. In addition, on the light emitting APC circuit 65, the variable resistor 67 for adjusting an irradiated light amount of laser light irradiated from the light emitting element 41 is mounted. After the light emitting circuit substrate 60 is mounted in the first casing 21, an adjustment tool is inserted from the opening portion 23 of an upper surface of the first casing 21, and a resistance value of the variable resistor 67 is adjusted, and thereby, it is possible to carry out a work of adjusting an irradiated light amount of the light emitting element 41 to a predetermined reference value.

After adjustment of an irradiated light amount is carried out by the variable resistor 67, the shield plate 68 is mounted from an upper side to the mounting surface 64 of the light emitting circuit substrate 60, so as to cover the light emitting APC circuit 65 and the monitor signal amplifying circuit 66. The shield plate is composed of one thin stainless-steel (e.g., SUS304 steel) plate. On the light emitting circuit substrate 60, a ground layer (not shown in the figure) is formed nearly on a whole surface, and the shield plate 68 is electrically connected to this ground layer, and thereby, the light emitting APC circuit 65 and the monitor signal amplifying circuit 66 are covered by the shield plate 68 and the ground layer, and an influence of an electromagnetic field etc. are blocked.

Adjustment of an irradiated light amount of the light emitting element 41 by the variable resistor 67 is carried out after the light receiving circuit substrate 70 and the light emitting circuit substrate 60 are incorporated in the first casing 21, but at this time, if the light receiving circuit substrate 70 is disposed on an more upper side (opening portion 23 side) than the light emitting circuit substrate 60, it is not possible to operate the variable resistor 67. If it is configured in such a manner that the light emitting circuit substrate 60 is disposed on the opening portion 23 side rather than the light receiving circuit substrate 70, like this embodiment, even after the light receiving circuit substrate 70 and the light emitting circuit substrate 60 are incorporated into the first casing 21, it is possible to carry out adjustment of an irradiated light amount of the light emitting element 41 by operating the variable resistor 67 from the opening portion 23 side.

Figure 13:
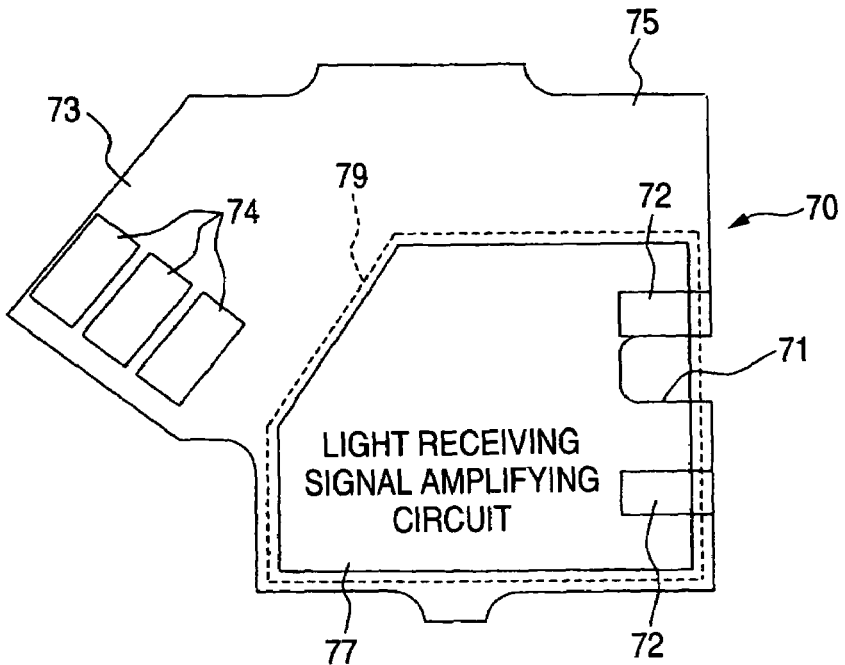
FIG. 13(a) is a view viewed from an upper side of a light receiving circuit substrate.
FIG. 13(b) is a view viewed from a lower side of a light receiving circuit substrate.
Figure 13:
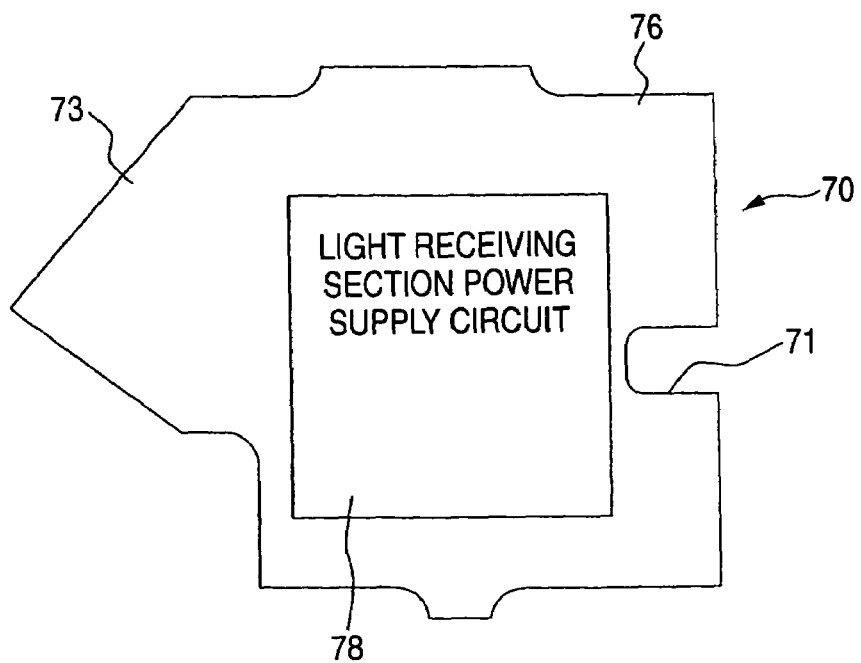

FIGS. 13 (*a*) and (*b*) are plan views of the light receiving circuit substrate 70, and FIG. 13(*a*) is a view viewed from an upper side, and FIG. 13(*b*) is a view viewed from a lower side. The light receiving circuit substrate 70 is configured by a hard substrate such as a glass epoxy substrate. On the light receiving circuit substrate 70, mounting surfaces 75, 76 are formed on its upper and lower, both surfaces, respectively. A light receiving signal amplifying circuit 77 is mounted on the upper side mounting surface 75, and a light receiving section power supply circuit 78 is mounted on the lower side mounting surface 76. The light receiving signal amplifying circuit 77 is disposed so as to be connected to the land 72 on an upper surface front portion of the light receiving circuit substrate 70. The light receiving power supply circuit 78 is disposed on a lower surface center portion of the light receiving circuit substrate 70. The light receiving signal amplifying circuit 77 and the light receiving power supply circuit 78 are electrically connected to each other, by print wiring which is not shown in the figure, and connected to the land 74.

The light receiving signal amplifying circuit 77 amplifies a light receiving signal which corresponds to a received light amount of laser light in the light receiving element 42. The light receiving power supply circuit 78 is an electric circuit for electric power supply to each electric component mounted on the light receiving circuit substrate 70.

On the light receiving circuit substrate 70, a shield plate 79 is mounted, so as to cover the light receiving signal amplifying circuit 77 mounted on the upper side mounting surface 75, in such a situation that it is mounted on the mounting surface 32 in the first casing 21. The shield plate 79 is composed of one thin stainless-steel (e.g., SUS304 steel) plate. On the light receiving circuit substrate 70, a ground layer (not shown in the figure) is formed nearly on a whole surface, and the shield plate 79 is electrically connected to this ground layer, and thereby, the light receiving signal amplifying circuit 77 is covered by the shield plate 79 and the ground layer, and an influence of an electromagnetic field etc. are blocked.

Figure 14:
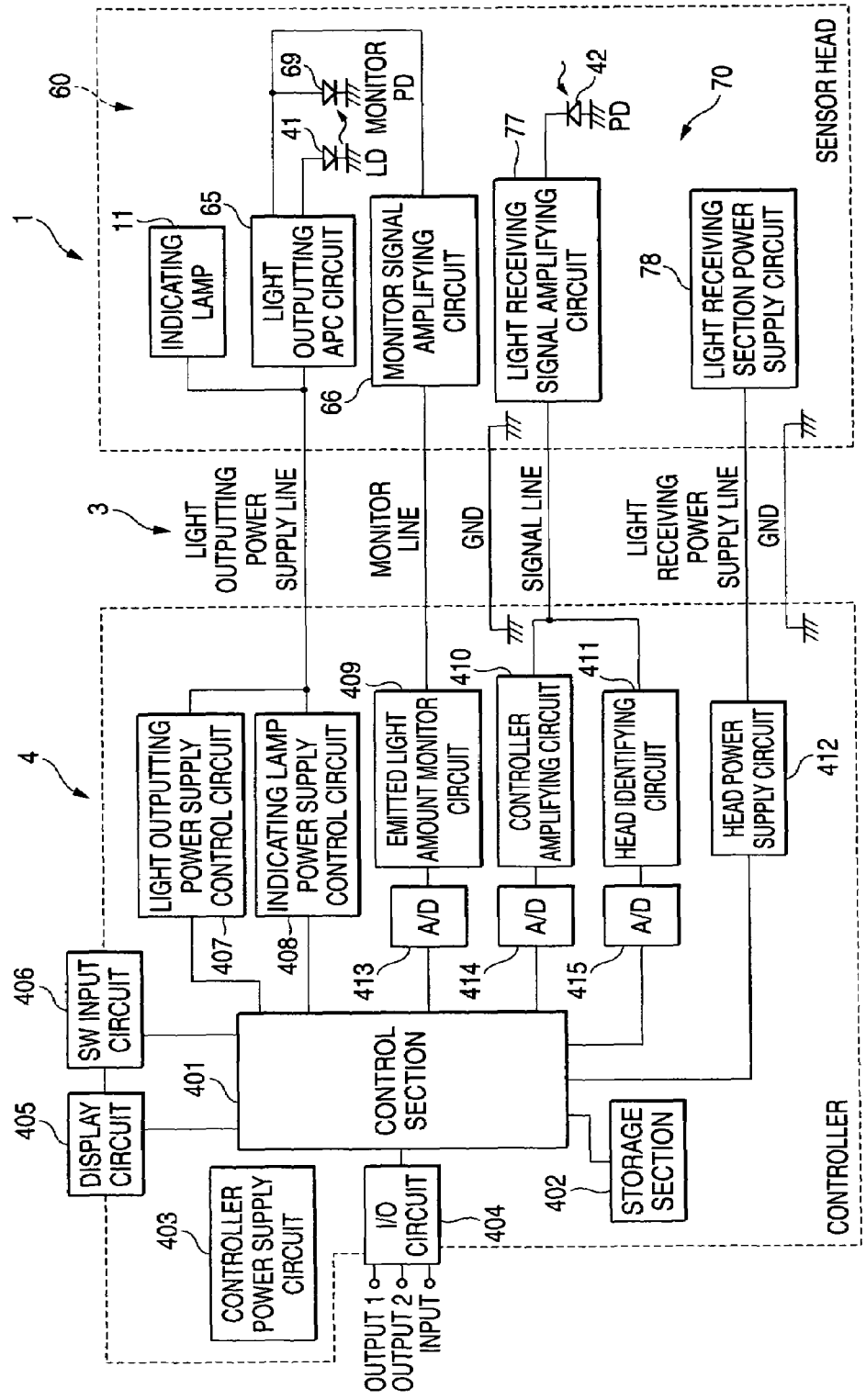
FIG. 14 is a block diagram which shows an electric configuration of a regressive reflection type photoelectric switch of this embodiment.

FIG. 14 is a block diagram which shows an electric configuration of the regressive reflection type photoelectric switch of this embodiment. The switch main body 1 and the controller 4 are electrically connected to each other, through the cable 3 including a light emitting power supply line, a monitor line and a GND (ground) line connected to the light emitting circuit substrate 60.

The switch main body 1 comprises a monitor light receiving element 69 which receives light irradiated from the light emitting element 41 and outputs a monitor signal, in addition to the above-mentioned indicating lamp 11, the light emitting element 41 and the light receiving element 42, the light emitting APC circuit 65 and the monitor signal amplifying circuit 66 mounted on the light emitting circuit substrate 60, and the light receiving signal amplifying circuit 77 and the light receiving section power supply circuit 78 mounted on the light receiving circuit substrate 70. The light emitting element 41 is connected to the light emitting APC circuit 65. The monitor light receiving element 69 is connected to the light emitting APC circuit 65 and the monitor signal amplifying circuit 66. The light receiving element 42 is connected to the light receiving signal amplifying circuit 77.

The controller comprises a control section 401, a storage section 402, a controller power supply circuit 403, an I/O (Input/Output) circuit 404, a display circuit 405, a switch input circuit 406, a light emitting power supply control circuit 407, an indicating lamp power supply control circuit 408, an emitted light amount monitor circuit 409, a controller amplifying circuit 410, a head identifying circuit 411, a head power supply circuit 412 and an A/D (Analog/Digital) converters 413, 414, 415. The storage section 402, the I/O circuit 404, the display circuit 405, the switch input circuit 406, the light emitting power supply control circuit 407, the indicating lamp power supply control circuit 408 and the head power supply circuit 412 are directly connected to the control section 401, and the emitted light amount monitor circuit 409, the controller amplifying circuit 410 and the head identifying circuit 411 are connected to the control section 401, through the A/D converters 413, 414, 415, respectively.

The control section 401 comprises CPU (not shown in the figure), and controls operations of the controller 4 and the switch main body 1 connected to the controller 4. The storage section 402 comprises RAM (not shown in the figure), and stores data required at the time of control. The controller power supply control circuit 403 is an electric circuit for electric power supply to each electric component provided in the controller 4. The I/O circuit 404 has one input terminal and two output terminals, and connects the controller 4 to an external device. The display circuit 405 is an electric circuit for display of a level of a received light amount in the light receiving element 41 and a threshold value at the time detection, etc. The switch input circuit 406 is an electric circuit for processing a setting operation by a switch input such as mode setting.

The light emitting power supply control circuit 407 controls electric power to be supplied to each electric component provided on the light emitting circuit substrate 60 of the switch main body 1. The indicating lamp power supply control circuit 408 controls electric power to be supplied to the indicating lamp 11 of the switch main body 1. The light emitting power supply control circuit 407 and the indicating lamp power supply control circuit 408 are connected in the controller 4, and connected to the light emitting APC circuit 65 and the indicating lamp 11 of the switch main body 1, respectively, through a common light emitting power supply line. The GND line, which is connected to the light emitting circuit substrate 60, connects each electric component, which is provided on the light emitting circuit substrate 60, to ground, and to this GND line, the shield plate 68 (see, FIG. 12), which is mounted on the mounting surface 64 of the light emitting circuit substrate 60, is connected.

The controller amplifying circuit 410 and the head identifying circuit 411 are connected in the controller 4, and connected to the light receiving signal amplifying circuit 77 of the switch main body 1, through a common signal line. The controller amplifying circuit 410, amplifies a light receiving signal received from the light receiving signal amplifying circuit 77, and the control section 401 detects an amount of light received in the light receiving element 42 on the basis of the amplified light receiving signal. The head identifying circuit 411 is an electric circuit for identifying a type of the switch main body 1 (head) connected to the controller 4. The head power supply circuit 412 is connected to the light receiving section power supply circuit 78 of the switch main body 1, and controls electric power to be supplied to electric components provided on the light receiving circuit substrate 70. The GND line, which is connected to the light receiving circuit substrate 70, connects each electric component, which is provided on the light receiving circuit substrate 70, to ground, and to this GND line, the shield plate 79, which is mounted on the upper side mounting surface 75 of the light receiving circuit substrate 70, is connected.

In this embodiment, a circuit substrate is divided into the light emitting circuit substrate 60 and the light receiving circuit substrate 70, and they are disposed in the first casing 21 in a two-tier fashion, and one of them is overlapped with at least a part of the optical system 40, and thereby, it is possible to obtain a wider range mounting surfaces 64, 75 in a small space, and therefore, it is possible to miniaturize the switch main body 1. There is not such necessity that a control circuit of the light emitting element 41 and a control circuit of the light receiving element 42 are electrically connected each other in a switch main body, and therefore, even in such a configuration that these things are mounted on different circuit substrates 60, 70 and respective circuit substrates 60, 70 are disposed in two-tier fashion, there is not such a case that workability at the time of fabrication comes down.

In addition, it is possible to miniaturize the switch main body 1 without miniaturizing the optical system 40 more than necessity, simply by changing a disposal configuration of components other than components of the optical system 40 in the switch main body 1, and therefore, it is possible to prevent lowering of detection accuracy which goes with miniaturization of the optical system 40, and it is possible to detect an object 6 with high accuracy.

In addition, in this embodiment, on the light emitting circuit substrate 60, the mounting surface 64 is formed only on an upper surface, and on the light receiving circuit substrate 70, the mounting surfaces 75, 76 are formed on both surfaces. The light emitting circuit substrate 60, which is disposed so as to be overlapped with the optical system 40, can be formed relatively large, and therefore, the mounting surface 64 is formed only on its upper surface, and it is not possible to form the light receiving circuit substrate 70, which is disposed in an area other than an area in which the optical system 40 is disposed on the mounting surface 32, so much larger as compared with the light emitting circuit substrate 60, and therefore, the mounting surfaces 75, 76 are formed on its both surfaces. By this means, it is possible to ensure sufficient mounting surfaces on both of the light emitting circuit substrate 60 and the light receiving circuit substrate 70.

Normally, a control circuit, which is mounted on the light emitting circuit substrate 60, includes more electric components to be shielded, than a control circuit which is mounted on the light receiving circuit substrate 70. In the example shown in FIGS. 12 and 13, either one of the light emitting APC circuit 65 and the monitor signal amplifying circuit 66, which are mounted on the light emitting circuit substrate 60, includes more electric components which are susceptible to an electromagnetic field etc., and should be shielded. On the one hand, the light receiving signal amplifying circuit 77, among the light receiving signal amplifying circuit 77 and the light receiving section power supply circuit 78 mounted on the light receiving circuit substrate 70, includes more electric components which are susceptible to an electromagnetic field etc. and should be shielded, but the light receiving section power supply circuit 78 does not have high necessity of shield. By disposing a control circuit of the light emitting element 41 only on an upper surface of the light emitting circuit substrate 60, it is possible to collectively shield electric components (e.g., light emitting APC circuit 65 and monitor signal amplifying circuit 66) included in a control circuit of the light emitting element 41, by one shield plate 68 (see, FIG. 12). In addition, by disposing electric components (e.g., light receiving signal amplifying circuit 77) to be shielded among electric components included in a control circuit of the light receiving element 42, on an upper surface of the light receiving circuit substrate 70, it is possible to shield electric components included in a control circuit, of the light receiving element 42, by one shield plate 79 (see, FIG. 13(a)). Therefore, it is possible to shield each electric component by less shield member, and therefore, it is possible to configure the switch main body 1 cheaper.

In addition, by disposing the light emitting circuit substrate 60 and the light receiving circuit substrate 70, which are made by a hard substrate, respectively, in the first casing 21 in a two-tier fashion, it is possible to ensure a sufficient mounting surface even if a flexible substrate is not used. Therefore, by using a hard substrate such as a glass epoxy substrate but not an expensive circuit substrate like a flexible substrate, it is possible to configure the switch main body 1 inexpensively.

Furthermore, in this embodiment, by forming through-holes 30, 31 for inserting a fixing tool in the second casing 22 but not in the first casing 21, it is possible to ensure a space for carrying out focus adjustment of the light emitting element 41 by use of a jig in the first casing 21, at the time of fabrication, and therefore, workability at the time of fabrication is improved. In addition, by forming the through-holes 30, 31 in the second casing 22, even on the occasion of optic axis adjustment and solder-mounting of a light emitting optical system on the first casing 21, its work is not blocked, and workability is improved.

The present invention is not limited to contents of the above-described embodiments, and various modifications in a scope described in claims are possible.

What is claimed is:

1. A reflection type photoelectric switch comprising:
a first casing which has a mounting surface and an opening portion formed so as to face to the mounting surface;
a second casing which covers the opening portion of the first casing;
an optical system including an optic axis of emitting light and receiving light in parallel with the mounting surface of the first casing, and a light emitting element and a light receiving element, which is disposed in a predetermined area on the mounting surface in the first casing;
a light emitting circuit substrate which is disposed in the first casing and has a control circuit of the light emitting element mounted thereon; and
a light receiving circuit substrate which is disposed in the first casing and has a control circuit of the light receiving element mounted thereon,
wherein one of the light emitting circuit substrate and the light receiving circuit substrate is disposed in an area other than the area on the mounting surface in the first casing in which the optical system is disposed, and the other is disposed so as to be overlapped with at least a part of the optical system, on the opening portion side in the first casing.

2. The reflection type photoelectric switch as set forth in claim 1, wherein the light receiving circuit substrate is disposed in the area other than the area on the mounting surface in the first casing in which the optical system is disposed, and the light emitting circuit substrate is disposed so as to be overlapped with at least the part of the optical system, on the opening portion side in the first casing.

3. The reflection type photoelectric switch as set forth in claim 2, wherein the light emitting circuit substrate has amounting surface formed on only a surface on the opening portion side, and
the light receiving circuit substrate has mounting surfaces formed on both surfaces.

4. The reflection type photoelectric switch as set forth in claim 3, further comprising:
shield members mounted on the light emitting circuit substrate and the light receiving circuit substrate, respectively.

5. The reflection type photoelectric switch as set forth in claim 4, wherein the light emitting circuit substrate is hard substrate and the light receiving circuit substrate is a hard substrate.

6. The reflection type photoelectric switch as set forth in claim 5, wherein the second casing has a thorough-hole for inserting a fixing tool on the occasion of fixing the reflection type photoelectric switch.

7. The reflection type photoelectric switch as set forth in claim 4, wherein the second casing has a thorough-hole for inserting a fixing tool on the occasion of fixing the reflection type photoelectric switch.

8. The reflection type photoelectric switch as set forth in claim 2, wherein the light emitting circuit substrate is a hard substrate and the light receiving circuit substrate is a hard substrate.

9. The reflection type photoelectric switch as set forth in claim 8, wherein the second casing has a thorough-hole for inserting a fixing tool on the occasion of fixing the reflection type photoelectric switch.

10. The reflection type photoelectric switch as set forth in claim 2, wherein the second casing has a thorough-hole for inserting a fixing tool on the occasion of fixing the reflection type photoelectric switch.

11. A reflection type photoelectric switch comprising:
a first casing which has a mounting surface and an opening portion formed so as to face to the mounting surface;
a second casing which covers the opening portion of the first casing;
an optical system including an optic axis of emitting light and receiving light in parallel with the mounting surface of the first casing, and a light emitting element and a light receiving element, which is disposed in a first area on the mounting surface in the first casing;

a light emitting circuit substrate which is disposed in the first casing and has a control circuit of the light emitting element mounted thereon; and a light receiving circuit substrate which is disposed in the first casing and has a control circuit of the light receiving element mounted thereon, wherein one of the light emitting circuit substrate and the light receiving circuit substrate is disposed in a second area on the mounting surface in the first casing, the second area being different from the first area in which the optical system is disposed, and the other is disposed so as to be overlapped with at least a part of the optical system on the opening portion side in the first casing.

12. The reflection type photoelectric switch as set forth in claim 11, wherein the light receiving circuit substrate is disposed in the second area on the mounting surface, and the light emitting circuit substrate is disposed so as to be overlapped with at least the part of the optical system on the opening portion side in the first casing.

13. The reflection type photoelectric switch as set forth in claim 12, wherein the light emitting circuit substrate has a mounting surface formed on only a surface on the opening portion side, and the light receiving circuit substrate has mounting surfaces formed on both surfaces.

14. The reflection type photoelectric switch as set forth in claim 13, further comprising:

shield members mounted on the light emitting circuit substrate and the light receiving circuit substrate, respectively.

15. The reflection type photoelectric switch as set forth in claim 14, wherein the light emitting circuit substrate is a hard substrate and the light receiving circuit substrate are is a hard substrate.

16. The reflection type photoelectric switch as set forth in claim 15, wherein the second casing has a thorough-hole for inserting a fixing tool on the occasion of fixing the reflection type photoelectric switch.

* * * * *

UNITED STATES PATENT AND TRADEMARK OFFICE
CERTIFICATE OF CORRECTION

PATENT NO. : 7,427,748 B2
APPLICATION NO. : 11/452847
DATED : September 23, 2008
INVENTOR(S) : Deguchi et al.

It is certified that error appears in the above-identified patent and that said Letters Patent is hereby corrected as shown below:

IN THE CLAIMS:

Column 24, Claim 3, line 23, change "amounting" to --a mounting--.

Column 24, Claim 5, line 34, change "is hard" to --is a hard--.

Column 24, Claim 6, line 38, change "thorough-hole" to --through-hole--.

Column 24, Claim 7, line 42, change "thorough-hole" to --through-hole--.

Column 24, Claim 9, line 50, change "thorough-hole" to --through-hole--.

Column 24, Claim 10, line 54, change "thorough-hole" to --through-hole--.

Column 26, Claim 16, line 17, change "thorough-hole" to --through-hole--.

Signed and Sealed this

Tenth Day of March, 2009

JOHN DOLL
*Acting Director of the United States Patent and Trademark Office*